(12) United States Patent
Salmani et al.

(10) Patent No.: US 12,482,934 B2
(45) Date of Patent: Nov. 25, 2025

(54) SYSTEMS AND METHODS FOR BEAMFORMING USING AN ARRAY OF PHASE CHANGE MATERIALS

(71) Applicant: HUAWEI TECHNOLOGIES CO., LTD., Shenzhen (CN)

(72) Inventors: Mahsa Salmani, Vaughan (CA); Sreenil Saha, Longueuil (CA); Enxiao Luan, Vancouver (CA); Armaghan Eshaghi, Aurora (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 512 days.

(21) Appl. No.: 17/961,362

(22) Filed: Oct. 6, 2022

(65) Prior Publication Data

US 2024/0120652 A1    Apr. 11, 2024

(51) Int. Cl.
*H01Q 3/36* (2006.01)
(52) U.S. Cl.
CPC ..................... *H01Q 3/36* (2013.01)
(58) Field of Classification Search
CPC ....... H01Q 3/36; H01Q 3/2676; H04B 7/0617
See application file for complete search history.

(56) References Cited

U.S. PATENT DOCUMENTS 11,817,903 B2 * 11/2023 Pleros .................. G06N 3/04
11,955,732 B2 * 4/2024 Alpman ............... H03L 7/145

2019/0212472 A1 * 7/2019 Tennant ................ H04B 10/50
2020/0112378 A1 * 4/2020 Holzheimer ......... H04B 7/0617
2021/0126669 A1 * 4/2021 Roberts .................... H04L 5/14
2021/0265727 A1 * 8/2021 Murakowski ...... H01Q 21/0025
2022/0045757 A1 * 2/2022 Pleros ................ H04Q 11/0005
2022/0263582 A1 * 8/2022 Ma ........................ H04B 10/614

FOREIGN PATENT DOCUMENTS

WO    2023065005 A1    4/2023

OTHER PUBLICATIONS

A 25-30 GHz Fully-Connected Hybrid Beamforming Receiver for MIMO Communication, (vol. 53, No. 5, pp. 1275-1287), IEEE J. Solid-State Circuits, 2018.

(Continued)

*Primary Examiner* — Vladimir Magloire
*Assistant Examiner* — Anna K. Gosling

(57) ABSTRACT

A method of beamforming by which a signal is received by a crossbar array of phase change materials (PCM) operative to be modulated electronically to impart complex Cartesian weighting and to retain transmission parameters for future processing. A PCM crossbar array can receive a signal from carrier waves modulated by an array of antenna elements, and send a complex Cartesian weighed result to a baseband combiner. Alternatively, a PCM crossbar array can receive a signal from carrier waves modulated by a baseband precoder, and send a complex Cartesian weighed result to an array of antenna elements. Either of the baseband combiner and baseband precoder can be digital or optical. Implementations allow optically based beamforming with the retention of long-term stochastics in the PCM cells, and are therefore broadband, fast, and energy efficient, as channel state information is not required to be stored otherwise.

21 Claims, 17 Drawing Sheets

(56) References Cited

OTHER PUBLICATIONS

Alkhateeb, A., Leus, G., & Heath, R. W. (2015). Limited feedback hybrid precoding for multi-user millimeter wave systems. IEEE transactions on wireless communications, 14(11), 6481-6494.

Sohrabi, F., & Yu, W. (2016). Hybrid digital and analog beamforming design for large-scale antenna arrays. IEEE Journal of Selected Topics in Signal Processing, 10(3), 501-513.

Park, Sungwoo, et al. "Exploiting spatial channel covariance for hybrid precoding in massive MIMO systems." IEEE Transactions on Signal Processing 65.14, 2017.

* cited by examiner

SYSTEMS AND METHODS FOR BEAMFORMING USING AN ARRAY OF PHASE CHANGE MATERIALS

CROSS-REFERENCE TO RELATED APPLICATIONS

This is the first application filed for the present disclosure.

TECHNICAL FIELD

This disclosure pertains generally to the field of radio frequency (RF) beamforming, and in particular, to hybrid beamforming systems and related methods.

BACKGROUND

Wireless communication networks of the next generation (5G and 6G) are expected to have high data rates (more than 1 Gbps), very low latency (less than 1 ms), ultra-high reliability, and low energy consumption. One approach to achieve this is to increase the carrier frequencies to millimeter waves (mmWave) where bandwidths can be much wider and data rates can be orders of magnitude greater. Moreover, because of the short wavelength of mmWave signals, large scale antenna arrays can be deployed in a relatively small area, which can help mitigate large path losses and support directional transmissions with multiple-input multiple-output (MIMO) architectures. For mmWave channels having too much path loss and/or channel intermittency that may be caused by interference between different signals, MIMO systems can be used with "beamforming" techniques.

Beamforming is a technique performed with an antenna array at a base station (BS) and/or a user equipment (UE), for focusing a transmitted or received signal power and creating a directional link between the BS and the UE. In some wireless communication systems where a massive number of users are served by base stations equipped with a massive number of antennas, efficient beamforming can be required to satisfy user demands.

In the prior art, beamforming is achieved by changing the phase of an input signal at each element of a receiving antenna, such that the signals add up constructively or destructively, and hence be targeted or not to that receiving antenna. Based on the design of a radio frequency (RF) front-end that interfaces with the antenna elements, beamformer architectures can be divided into two main categories: analog beamformers and digital beamformers. However, considering the drawbacks of each of those architectures, a hybrid approach, which combines both analog and digital beamforming, has also been introduced.

A drawback of analog beamforming is that it can be limited to supporting one data stream at a time. The architecture can have low power consumption, but when many antennas are involved, the high number of signal divisions can cause high insertion losses.

Digital beamforming can support a higher number of data streams than analog beamforming, by having an RF chain for each antenna element. However, electronic components of the RF chain can require large power consumptions, and signal processing has a higher complexity.

A hybrid beamforming architecture can provide advantages over each of the digital and analog beamforming approaches. Typically, full channel state information (CSI) availability is required at the transmitter for any antenna of a system. However, this has several drawbacks. First, these methods are limited to scenarios where a channel is time-invariant or slowly varying. Then, for a system with a large number of devices and a large number of antenna elements, it can be difficult to obtain reliable, complete instantaneous CSI for an entire channel matrix, especially when the number of antennas at the base station is large. To address this issue, some approaches for channel estimation use compressive sensing to estimate sparse channels. A channel is said to be sparse when the number of paths between the transmitter and the receiver in the system is limited, i.e., the number of effective scatterers is small in the system, such as in mmWave communications. Accordingly, the parameters of a sparse channel are fewer than those of a non-sparse channel.

Channel estimation in general means obtaining the parameters of the channel so as to design how to transmit signals. The channel estimation is required for sparse channels as well, while sparse channels will have smaller number of parameters to be captured, so the whole channel estimation process would be less complex.

However, compressive sensing requires more measurements than a digital structure and require sparsity in the channel. Moreover, for a channel selecting frequencies based on wideband orthogonal frequency division multiplexing (OFDM) systems, it can be difficult to apply these approaches directly.

Obtaining full CSI for all antennas in massive MIMO systems can be costly, if not impossible. In a conventional hybrid beamforming architecture, due to the limited number of RF chains, the number of observations of the channel is less than the number of antennas. In the prior art, a two-stage beamforming architecture using electronic phase shifters has been proposed to tackle the CSI issue. However, it has proven to be costly and complex, particularly in fully connected architectures.

A two-stage hybrid beamformer can reduce the complexity of a beamforming architecture. However, it can require an electronics-based, analog precoder part. And because of multiple divisions in the signal path and the length of the transmission lines, insertion losses and transmission line losses can increase with the number of antenna elements. Embedded amplifiers are therefore required in the beamforming network (BFN) to maintain signal powers at a useable level. A two-stage beamformer also requires electronics-based phase shifters, which are computationally complex, have a large footprint, and are power consuming components.

Although some of these issues can be addressed with a photonics-based beamformer, those of the prior art can require a coherent and monochromatic light source, making them unsuitable to support the multiple data streams expected in the next generations of wireless communications. Moreover, photonics-based beamformers of the prior art require a large footprint.

Some scalable photonics-based beamforming architectures of the prior art are based on banks of add-drop spectral filters such as microring resonators (MRRs). However, drawbacks of an MRR weight bank architecture include undesired amplitude attenuation and phase shifting of the signa. Hence, additional components, such as tunable attenuators and MRR filters, can be required to compensate for these effects.

Therefore, there is a need for beamforming methods and/or systems that can process more than one data stream at a time, that have low insertion, low transmission line losses, and little to no low power consumption, that are scalable, that have a smaller footprint, that are not limited to coherent light sources, and that introduce little to no undesired amplitude attenuation and phase shifting of the signal or that require less compensating components.

There is also a need for beamforming methods and/or systems where signal processing is simpler, where a channel is time-invariant or slowly varying, where obtaining reliable, complete and instantaneous CSI for an entire channel matrix is simpler, and where phase shifters are not as computationally complex as electronics-based phase shifters.

Methods and/or systems for beamforming with such features would obviate or mitigate one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

By incorporating phase-change materials, a photonics-based beamforming architecture according to embodiments can apply phase shifts to signals to effectuate beamforming, while also providing a non-volatile memory to retain information about long-term slow-varying statistical parameters of the channel.

An embodiment exploits the in-memory computing opportunity provided by a phase change material (PCM) crossbar array; exploiting the non-volatile properties of PCMs to capture the long-term (frequency-independent) features of wireless communication channels, which may avoid the necessity of obtaining and employing instantaneous channel state information to design RF beamforming.

An embodiment offers a significant efficiency improvement as compared to the existing optical beamforming architecture, due to the easy implementation and long-term passive value retention.

An embodiment exploits the high bandwidth, tunability, and scalability of optical components to implement fully connected RF beamforming.

An embodiment exploits photonic circuits which are immune to electromagnetic interference and do not suffer from crosstalk provided that the wavelength channels have sufficiently wide spacing.

An embodiment may realize a fully connected beamforming architecture and scale with increasing antennas and baseband streams.

An embodiment overcomes the prior art limitation of requiring precise phase matching between channels, which is sensitive to process and temperature variations, by combining signal components through incoherent detection.

In accordance with embodiments of the present disclosure, there is provided a signal processing system for wireless communication. The system comprises a photonic Cartesian complex-weighting module, which comprises: first optical waveguides each having a respective input port configured to receive a respective optical signal; second optical waveguides distinct from the first optical waveguides, the second optical waveguides each having a respective output port; and a plurality of phase change material (PCM) couplers. Each of the first optical waveguides is coupled to each of the second optical waveguides by respective PCM couplers of the plurality of PCM couplers. Each of the plurality of PCM couplers is configured to receive a respective electrical control signal to control an intensity of light coupled from a respective first optical waveguide into a respective second optical waveguide. A light intensity at the output port of each respective second optical waveguide is a weighted sum of the intensity of light coupled from each of the first optical waveguides into the respective second optical waveguide. The weighted sum is a function of the electrical control signals received at the respective PCM couplers that control the intensity of light coupled from the first optical waveguides into the respective second optical waveguide. The signal processing system for wireless communication also comprises a plurality of optical detector devices (ODDs), each of which coupled to a pair of output ports of a respective pair of second optical waveguides and configured to output a detector electrical signal indicative of a difference between a light intensity in a first one of the second optical waveguides of the pair of second optical waveguides and a light intensity in a second one of the second optical waveguides of the pair of second optical waveguide. Each ODD is electrically coupled to one other ODD to form a pair of ODDs to produce a combined detector electrical signal. The signal processing system for wireless communication additionally comprises an input module coupled to the Cartesian complex-weighting module and configured to generate each respective optical signal and to provide each respective optical signal to a respective first optical waveguide; and an output module coupled to the Cartesian complex-weighing module and configured to process the combined detector electrical signals.

In some embodiments, each of the plurality of PCM couplers comprises a respective PCM element that has a respective optical transmission coefficient, and each respective electrical control signal is applied to the respective PCM element of the respective PCM coupler to change the respective optical transmission coefficient. Each respective PCM element is configured to maintain the respective optical transmission coefficient in absence of any electrical control signal. In further embodiments, each respective PCM element comprises a germanium-antimony-tellurium material, an arsenic trisulfide material, a vanadium dioxide material, and antimony telluride material, or an antimony sulfide material.

In some embodiments, the signal processing system is configured to communicate with user terminals through a spatial channel having associated thereto channel state information (CSI). The signal processing system further comprises a controller configured to generate the electrical control signals in accordance with the CSI.

In some embodiments, for each pair of ODDs coupled to each other to produce a respective combined detector electrical signal, the electrical control signals received by the PCM couplers coupled to the second waveguides coupled to one ODD of the pair of ODDs are set in accordance with a real part of complex number and the electrical control signals received by the PCM couplers coupled to the second waveguides coupled to the other ODD of the pair of ODDs are set in accordance with an imaginary part of the complex number. An arctangent of a ratio of the imaginary part to the real part representing a predetermined phase shift.

In some embodiments, the signal processing system is a downlink signal processing system, and the input module is a baseband precoder module that comprises a baseband precoder configured to generate a plurality of precoder output signals. The baseband precoder module further comprises a plurality of modulators, and a plurality of light sources. Each of the plurality of modulators is configured to receive a respective one of the plurality of precoder output signals and to modulate light output from a respective one of the plurality of light source in accordance with the respective one of the precoder output signals to obtain a respective modulated optical signal and to provide the respective modulated optical signal to a respective one of the first optical waveguides. The signal processing system also comprises, as the output module, an antenna module that comprises a plurality of antennas. Each of the plurality of antennas is coupled to the photonic Cartesian complex-weighting module to receive a respective combined detector electrical signal.

In some embodiments, the baseband precoder is a digital baseband precoder. In further embodiments, the baseband precoder is an optical baseband precoder.

In some embodiments, the plurality of antennas is a phased array of antennas.

In some embodiments, the signal processing system further comprises a plurality of transimpedance amplifiers, each of which is connected to a respective ODD and is configured to amplify the respective detector electrical signal output by the respective ODD.

In some embodiments, the signal processing system is a downlink signal processing system that comprises a plurality of ninety-degree phase shifters. For each pair of ODDs coupled to each other to produce the respective combined detector electrical signal, a respective ninety-degree phase shifter is coupled to the ODD of the pair of ODDs that receives the electrical control signals set in accordance with the imaginary part of the complex number.

In some embodiments, the signal processing system is an uplink signal processing system and the input module is an antenna module that comprises a plurality of antennas, a plurality of modulators; and a plurality of light sources. Each of the plurality of antennas is configured to receive a respective wireless signal and to generate a respective antenna electrical signal in accordance with the respective wireless signal. Each of the plurality of modulators is coupled to a respective one of the plurality of antennas and to a respective one of the plurality of light sources. Each of the plurality of modulators is configured to modulate a respective optical signal generated by a respective one of the plurality of light sources in accordance with the respective antenna electrical signal to obtain a respective modulated optical signal. Each of the plurality of modulators is configured to provide the respective modulated optical signal to a respective one of the first optical waveguides; and the output module is a baseband combiner module comprising a baseband combiner.

In some embodiments, the baseband combiner is a digital baseband combiner. In further embodiments, the baseband combiner is an optical baseband combiner.

In some embodiments, signal processing system comprises a plurality of low noise amplifiers, each of which coupled to a respective one of the plurality of antennas and configured to amplify the respective antenna electrical signal.

In some embodiments, the plurality of ODDs is a plurality of balanced photodetectors.

In accordance with embodiments of the present disclosure, there is provided a signal processing system for wireless communication. The system comprises a photonic Cartesian complex-weighting (CCW) module that has: first optical waveguides each having a respective input port configured to receive a respective optical signal; second optical waveguides distinct from the first optical waveguides, the second optical waveguides each having a respective output port; and a plurality of phase change material (PCM) couplers. Each of the first optical waveguides is coupled to each of the second optical waveguides by respective PCM couplers of the plurality of PCM couplers. Each of the plurality of PCM couplers is configured to receive a respective electrical control signal to control an intensity of light coupled from a respective first optical waveguide into a respective second optical waveguide. A light intensity at the output port of each respective second optical waveguide is a weighted sum of the intensity of light coupled from each of the first optical waveguides into the respective second optical waveguide. The weighted sum is a function of the electrical control signals received at the respective PCM couplers that control the intensity of light coupled from the first optical waveguides into the respective second optical waveguide. The CCW module is configured to provide the light intensity at the output port of each respective second optical waveguide to a plurality of optical detector devices (ODDs) each of which coupled to a pair of output ports of a respective pair of second optical waveguides and configured to output a detector electrical signal indicative of a difference between a light intensity in a first one of the second optical waveguides of the pair of second optical waveguides and a light intensity in a second one of the second optical waveguides of the pair of second optical waveguide. Each ODD is electrically coupled to one other ODD to form a pair of ODDs to produce a combined detector electrical signal.

In some embodiments, each of the plurality of PCM couplers comprises a respective PCM element having a respective optical transmission coefficient. Each respective electrical control signal is applied to the respective PCM element of the respective PCM coupler to change the respective optical transmission coefficient, each respective PCM element being configured to maintain the respective optical transmission coefficient in absence of any electrical control signal.

In some embodiments, each respective PCM element comprises a germanium-antimony-tellurium material, an arsenic trisulfide material, a vanadium dioxide material, and antimony telluride material, or an antimony sulfide material.

In accordance with embodiments of the present disclosure, there is provided a method for processing wireless communication signals. The method comprises optically coupling each of a plurality of first waveguides to each of a plurality of second waveguides using a respective one of a plurality of phase change material (PCM) couplers, each PCM coupler having a respective PCM element, each PCM element having a transmission coefficient. The method further comprises providing a distinct optical signal to each first waveguide of the plurality of first waveguides, each distinct optical signal having encoded thereon a respective radio frequency (RF) signal or a respective baseband precoded signal. Furthermore, the method comprises providing a respective electric control signal to each respective PCM element to control the transmission coefficient thereof. Additionally, the method comprises, for each of a plurality of distinct pairs of second waveguides, determining or measuring, with a respective balanced photodetector, a respective difference between a light intensity output from one of the second waveguides of the respective pair of second waveguides and a light intensity output from the other of the second waveguides of the respective pair of second waveguides, to obtain a plurality of balanced electrical signals. The method also comprises, for each of a plurality of distinct pairs of balanced electrical signals of the plurality of balanced electrical signals, combining the balanced electrical signal of one of the respective pair of balanced electrical signals with the other balanced electrical signal of the respective pair of balanced electrical signal, to obtain a plurality of combined electrical signals. Further yet, the method comprises processing the plurality of combined electrical signals.

As will be understood by the skilled worker, the photonic Cartesian complex-weighting module of the present disclosure may be used to process wireless communication signals and may also be used to process signals other than wireless communication signals. Further, the Cartesian complex-weighting module of the present disclosure may be used to replace electronic phase shifters in any structure that needs to apply a phase change to signals, including beamforming structures.

In accordance with embodiments of the present disclosure, there is provided a system for beamforming a signal. The system comprises one or more substantially parallel horizontal optical waveguides, at least four substantially parallel vertical optical waveguides and at least four phase change material (PCM) couplers. Each horizontal optical waveguide intersects at least four vertical optical waveguides. Each intersection includes a respective one of the at least four PCM couplers, each configured to couple one of the one or more substantially parallel horizontal optical waveguides to one of the at least four substantially parallel vertical optical waveguides. And each of the at least four PCM couplers is configured to modify a respective transmission in accordance with a respective control signal.

In some embodiments, a number of the at least four substantially parallel vertical optical waveguides the number of parallel vertical optical waveguides is a multiple of four. A first vertical optical waveguide and a second vertical optical waveguide of a group of four vertical optical waveguides are operative to direct a first optical wave and a second optical wave to a first balanced photodetector operative to subtract the intensity of the first optical wave from the intensity of the second optical wave, to produce a first photocurrent representing a real part of a complex number. A third vertical optical waveguide and a fourth vertical optical waveguide of the group of four vertical optical waveguides are operative to direct a third optical wave and a fourth optical wave to a second balanced photodetector operative to subtract the intensity of the third optical wave from the intensity of the fourth optical wave, to produce a second photocurrent representing an imaginary part of the complex number. In some embodiments, the complex number is associated with a phase shift of the signal.

In some embodiments, the system further comprises an electronic control module coupled to each of the at least four PCM couplers and configured to generate control signals to modify a transmission of each of the at least four PCM couplers.

In some embodiments, each respective optical transmission of a PCM coupler is memorized by the PCM coupler until a subsequent control signal is provided to the respective PCM coupler.

In some embodiments, each optical transmission of a PCM coupler is memorized for a duration sufficient for the PCM coupler to be used for passing at least one other, subsequent optical wave.

In some embodiments, the system further comprises, for each horizontal optical waveguide a source generating an optical carrier wave for coupling into the horizontal optical waveguide, and a modulator operative to modulate a signal onto the optical carrier wave.

In some embodiments, the system further comprises, for each modulator: an antenna element to receive an RF signal; and a low noise amplifier to amplify and direct the RF signal to the modulator.

In some embodiments, the system further comprises, for each pair of a first balanced photodetector and a second photodetector local oscillators configured to receive the first photocurrent and the second photocurrent and to allow a baseband combiner to realize an in-phase component of a radio frequency signal and a quadrature component of the radio frequency signal.

In some embodiments, the system further comprises a baseband precoder and a plurality of local oscillators configured to convert an in-phase component of a radio frequency signal and a quadrature component of the radio frequency signal into an optical signal, and a modulator operative to modulate the optical signal onto the optical carrier wave.

In some embodiments, the system further comprises, for each pair of a first balanced photodetector and a second photodetector: a mixer configured to combine the first photocurrent representing the real part of a complex number and the second photocurrent representing the imaginary part of the complex number; and a power amplifier to amplify and direct the radio frequency signal to an antenna element operative to emit the radio frequency signal.

In some embodiments, each one of two branches of a balanced photodetector is operative to incoherently sum multiple optical waves propagated by a respective vertical optical waveguide of the PCM crossbar array.

In accordance with embodiments of the present disclosure, there is provided a beamforming system. The system comprises M optical waveguides each having a respective input port configured to receive a respective optical signal. The system also comprises N optical waveguides distinct from the M optical waveguides, M and N are positive integers. The system further comprises X phase change material (PCM) couplers, X being equal to M multiplied by N. Each of the X PCM couplers is configured to receive a respective control signal and to couple a respective one of the M optical waveguides to a respective one of the N optical waveguides in accordance with the respective control signal.

Technical benefits of beamforming according to embodiments may include a higher bandwidth and lower latency because some computations may be based on photonics instead of electronics.

Technical benefits of beamforming according to embodiments also include avoiding the necessity of obtaining complete channel state information CSI in each channel realization and reducing the power consumption of a beamformer by retaining the information in non-volatile PCM cells.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

It will be noted that throughout the appended drawings, like features may be identified by like reference numerals.

DETAILED DESCRIPTION

A single antenna can radiate a signal in all directions. However, if an array of antenna elements is used, a signal can be focused in a specific direction such as to form a beam of electromagnetic energy. Overlapping waves of a signal emitted by the array of antenna elements can be phase shifted individually to have constructive interference in some directions and destructive interference in other directions, such that an overall signal strength is dependent on direction. If designed and executed correctly, a beamforming process can generate or direct a signal according to a desired pattern.

In a simple scenario where a single path is desired, multiple antenna elements can transmit the same signal at the same wavelength, but with different phases. By doing so, the strength of the combined received signal at a specific direction is enhanced. By focusing a signal in the direction of a specific receiver, beamforming allows that receiver to receive a signal with a higher quality, which means a faster information transfer, fewer errors, and without having to amplify its broadcasting power.

Figure 1:
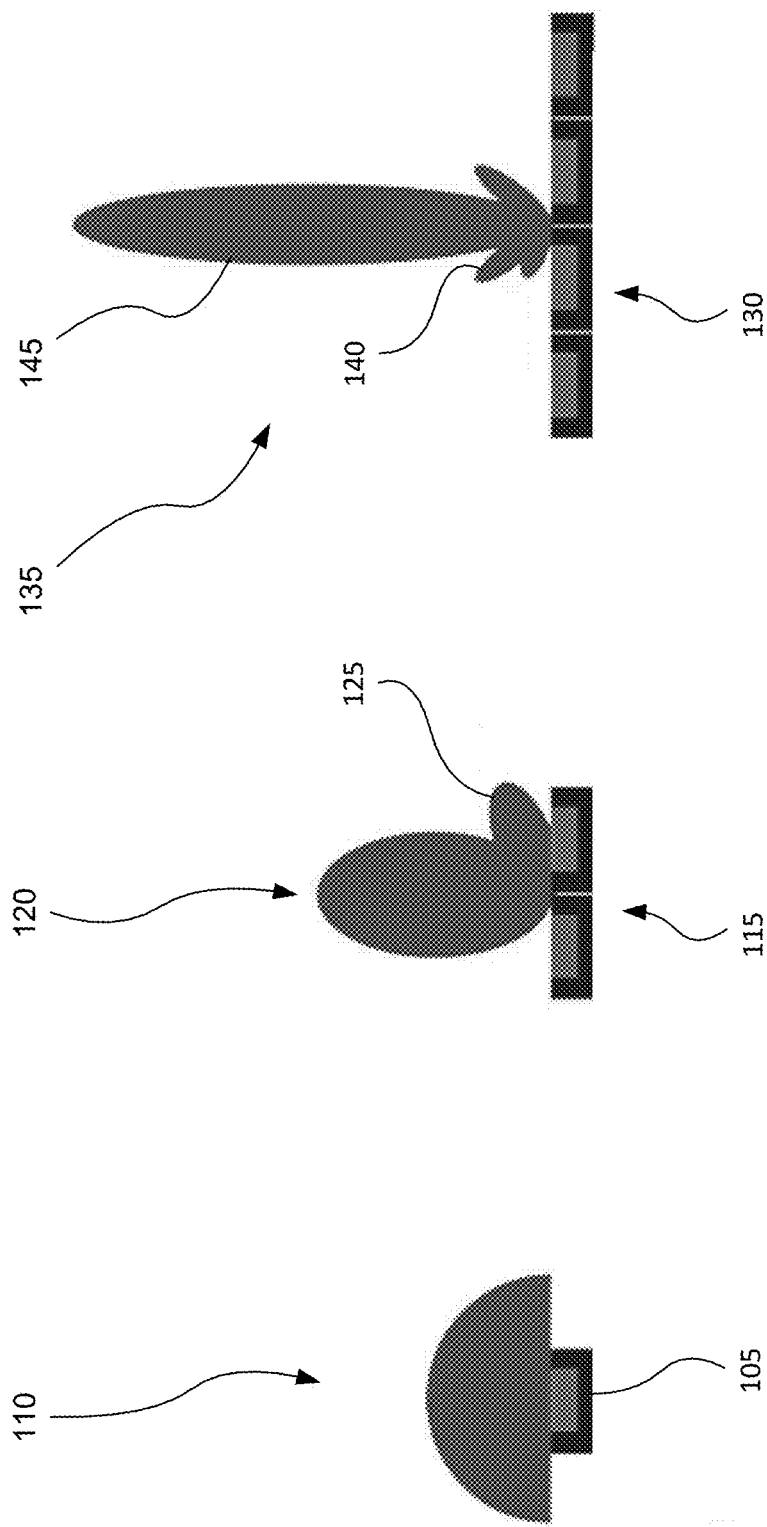
FIG. 1A shows an example of a beam generated by a one-antenna array.
FIG. 1B shows an example of a beam pattern generated by a two-antenna array.
FIG. 1C shows an example of a beam pattern generated by a four-antenna array.

FIGS. 1A, 1B and 1C illustrate how an array of antennas can be used for beamforming, according to an embodiment. In FIG. 1A, single antenna 105 emits a signal 110 as a spherical wave in many directions. In FIG. 1B, two antennas 115 generate a signal 120 made from two waves that interfere destructively and constructively. The two antennas 115 also generate a side lobe signal 125. In FIG. 1C, an array of four antennas 130 generates a signal 135 composed of four waves interfering destructively and constructively. The generated signal can include an increased number of side lobes 140. A plurality of lobes provides an opportunity to finely shape the overall signal, by tuning a phase shift applied at each antenna. In particular, the phases can be adjusted for one of the lobes to be highly directed 145, for example towards a target receiver.

Beamforming can also be achieved by changing the phase of an input signal at each element of a receiving antenna array, such that the signals add up constructively or destructively. Based on the design of a radio frequency (RF) front-end that interfaces with antenna elements, beamformer architectures can be divided into two main categories: analog beamformers and digital beamformers. However, considering the drawbacks of either architecture, a hybrid approach is also possible.

Analog beamforming can be implemented with a phased array having a single RF chain driven by a digital-to-analog (DAC) converter in a transmitter, or an analog-to-digital (ADC) converter in a receiver. The single RF path is split into several paths for beamforming to be performed by controlling the phase of each path so that a beam is formed in the far field in the direction of the intended user. The phases are constrained to being phase shifts that can be controlled using analog components. The phases applied by the phase shifters are typically quantized to a limited resolution, and they can be dynamically adjusted based on specific strategies to steer the beam. A drawback of analog beamforming is that only a single data stream can be supported at a time, so it is not an appropriate architecture in a network with a massive number of devices (users). The architecture has low power consumption, but a high number of antenna elements causes high insertion losses, due to the number of signal divisions.

Figure 2:
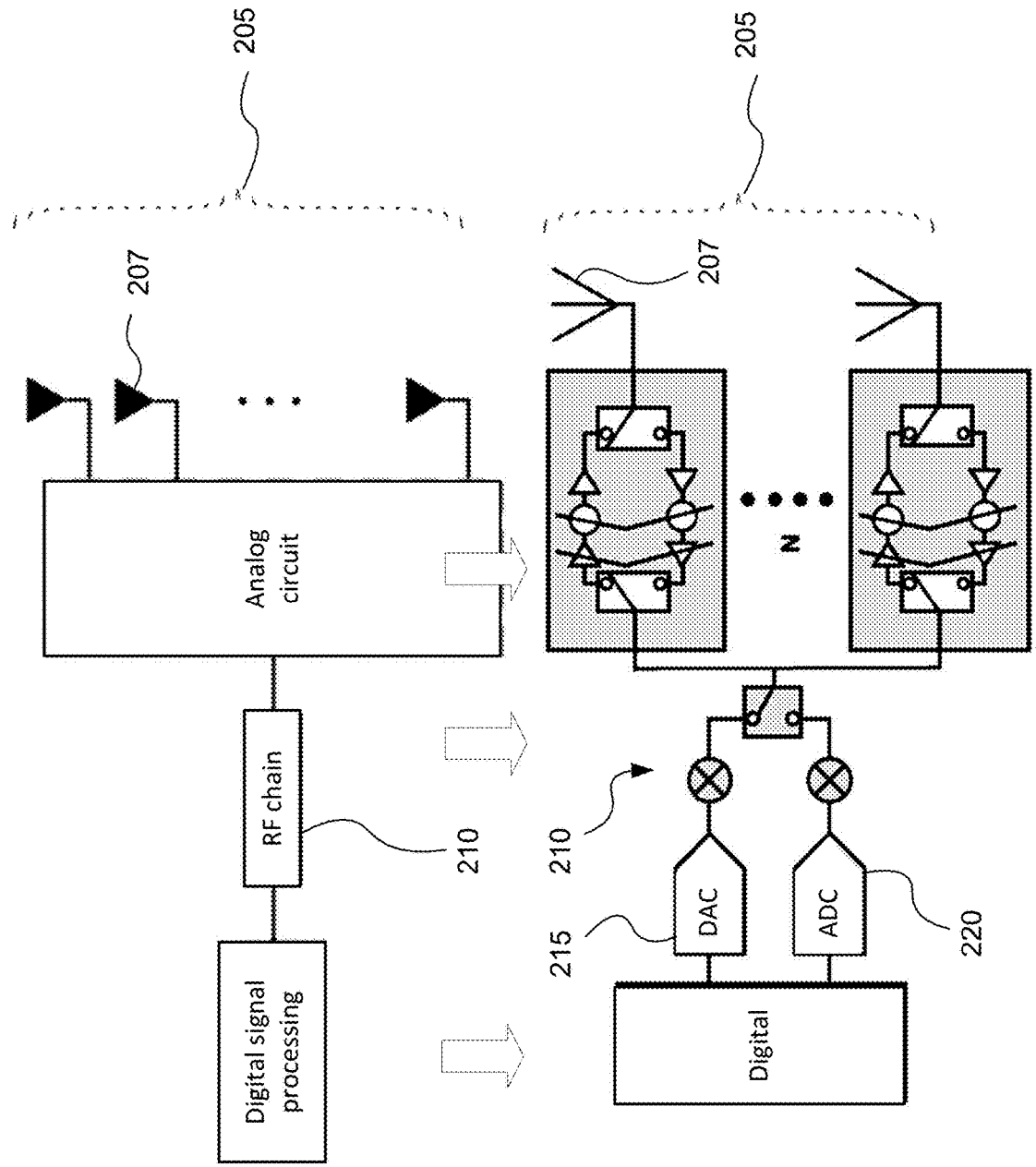
FIG. 2 shows a general, prior art architecture for hybrid beamforming.

FIG. 2 illustrates a general architecture for analog beamforming, according to an embodiment. A phased array 205 of multiple antenna elements 207 can be driven with a single radio-frequency (RF) chain 210, itself driven by a DAC 215, in a transmitter configuration, or by an ADC 220, in a receiver configuration.

In digital beamforming, a phase shift is implemented purely with digital circuitry and then fed to an antenna array through an array of transceivers. In particular, one RF chain is allocated to each antenna element. In terms of signal processing, this makes digital beamforming more flexible than analog beamforming. The required phase shifting, and weighting of signals are performed in a digital signal processing (DSP) unit. Digital beamforming can support a higher number of data streams than analog beamforming. However, the electronic components in each RF chain have large power consumption, and the signal processing required in digital beamforming architectures can be highly complex.

Figure 3:
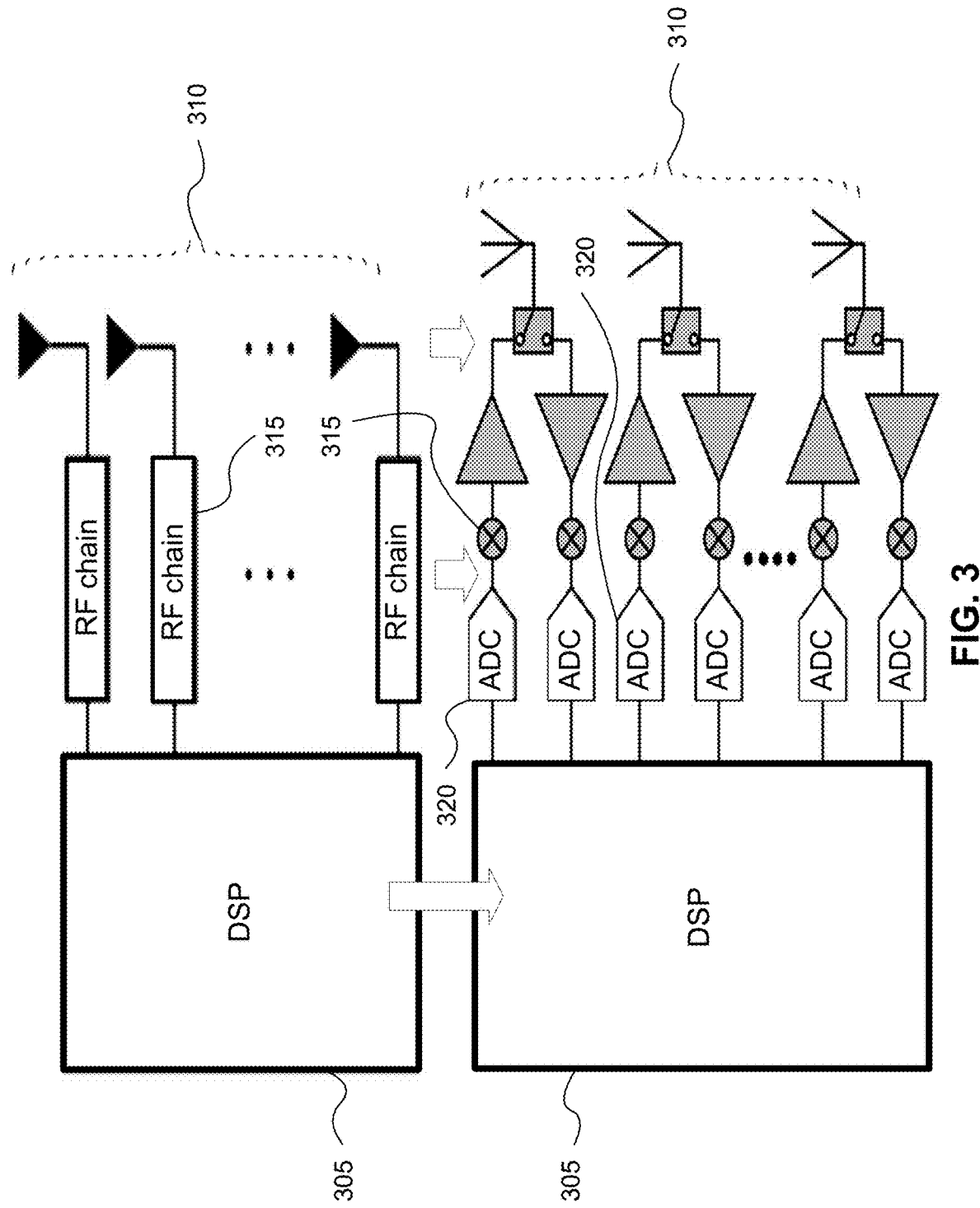
FIG. 3 shows a general, prior art digital beamforming architecture.

FIG. 3 illustrates a general digital beamforming architecture, according to prior art. A DSP unit 305 can perform weighing and phase shifting of signals emitted by an array of antenna elements 310. Each antenna element can be connected to the DSP via a dedicated RF chain 315 that includes an ADC 320.

Hybrid beamforming can address at least some challenges of both analog and digital beamforming architectures. In a multi-user massive MIMO system, a hybrid beamforming architecture can be preferable because it allows concurrent support of multiple data streams at a lower cost and complexity than a digital beamformer.

In an example of a hybrid architecture for a beamformer, a beamforming process can be divided into a low-dimensional digital baseband beamformer and adaptive to a dimension-reduced effective instantaneous channel; and a high-dimensional RF analog beamformer implemented with phase shifters and designed based on a spatial channel covariance matrix for long-term statistics of a channel.

As will be understood by the skilled worker, considering the parameters of the channel as some (random) variables, the spatial covariance matrix illustrates the correlation between the channel variables. However, this may not necessarily be correct for all hybrid beamforming architectures. The analog part of a hybrid beamformer can be designed any other way rather than the spatial channel covariance. In general, hybrid beamforming comprises one (usually low dimensional) digital part, and one (usually high dimensional) analog part. Each of those parts can be designed in different ways. The one considered in embodiments of the present disclosure is based on the long-term stochastics of the channel captured through spatial channel covariance.

Figure 4:
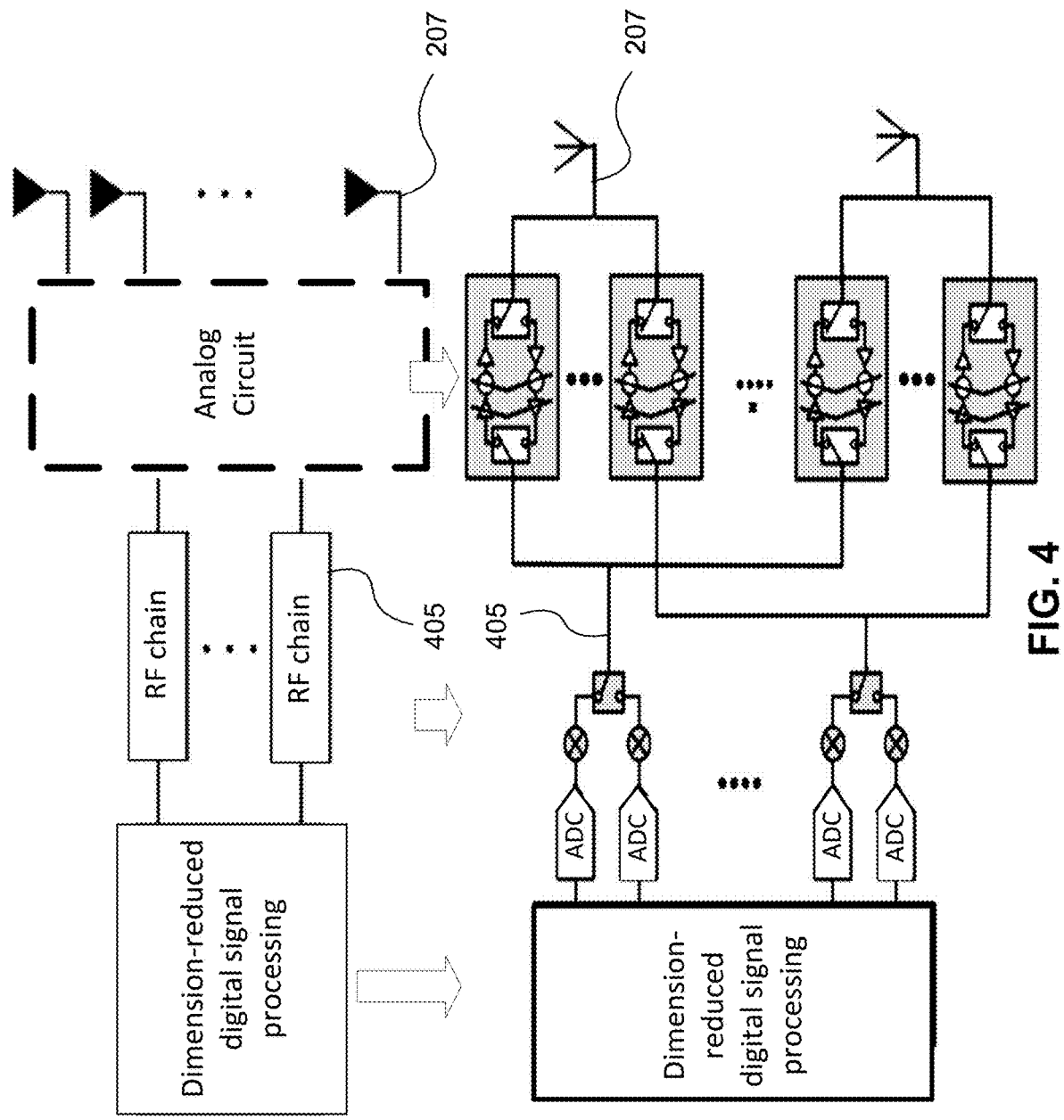
FIG. 4 shows a prior art hybrid beamforming architecture.

FIG. 4 illustrates a hybrid beamforming architecture, according to an embodiment. By having the output from each RF chain 405 connected to a respective antenna element 207 of an array, this architecture can be used to implement "fully-connected" hybrid beamforming. A hybrid beamforming architecture that is not fully connected is referred to as "partially-connected", in that the output of each of the RF chains is connected to some of the antenna elements, but not necessarily to all the antenna elements.

In a multiuser massive MIMO wireless communication system, the complexity of obtaining complete channel state information (CSI) for each channel realization can be addressed with a two-stage hybrid beamforming architecture. By partitioning channel information into long-term statistical parameters (i.e. stochastics) and short-term statistical parameters, and by using spatial channel covariance, a beamforming architecture can be more efficient in its use of time and power.

When used for a multiuser massive MIMO system, a two-stage hybrid beamformer can exploit the long-term statistics of the channels, in particular the spatial channel covariance, to configure the analog beamformer part. This makes channel estimation easier because the spatial channel covariance matrix changes over a longer time interval than instantaneous parameters of the channels.

To implement phase shifting, alternative solutions to an electronic-based architecture can include photonics-based beamforming techniques, which can offer benefits over electronic analog beamforming, such as a greater bandwidth and lower signal loss. Implementing photonics-based beamforming techniques requires RF-to-optical and optical-to-RF converters at the beamformer interfaces. Phase shifting a signal received at an antenna array can be based on true time delays.

Photonics-based beamforming can be based on Mach-Zehnder Modulators (MZMs) and Orthogonal Frequency Division Multiplexing (OFDM). However, this can require a coherent and monochromatic light source, which can make it difficult to support multiple data streams, a massive number of users, and a massive number of antenna elements at a base station (BS). Moreover, to provide sufficient group delay for RF beamforming applications, the true optical time delay lines they require must have relatively large footprints.

Figure 5:
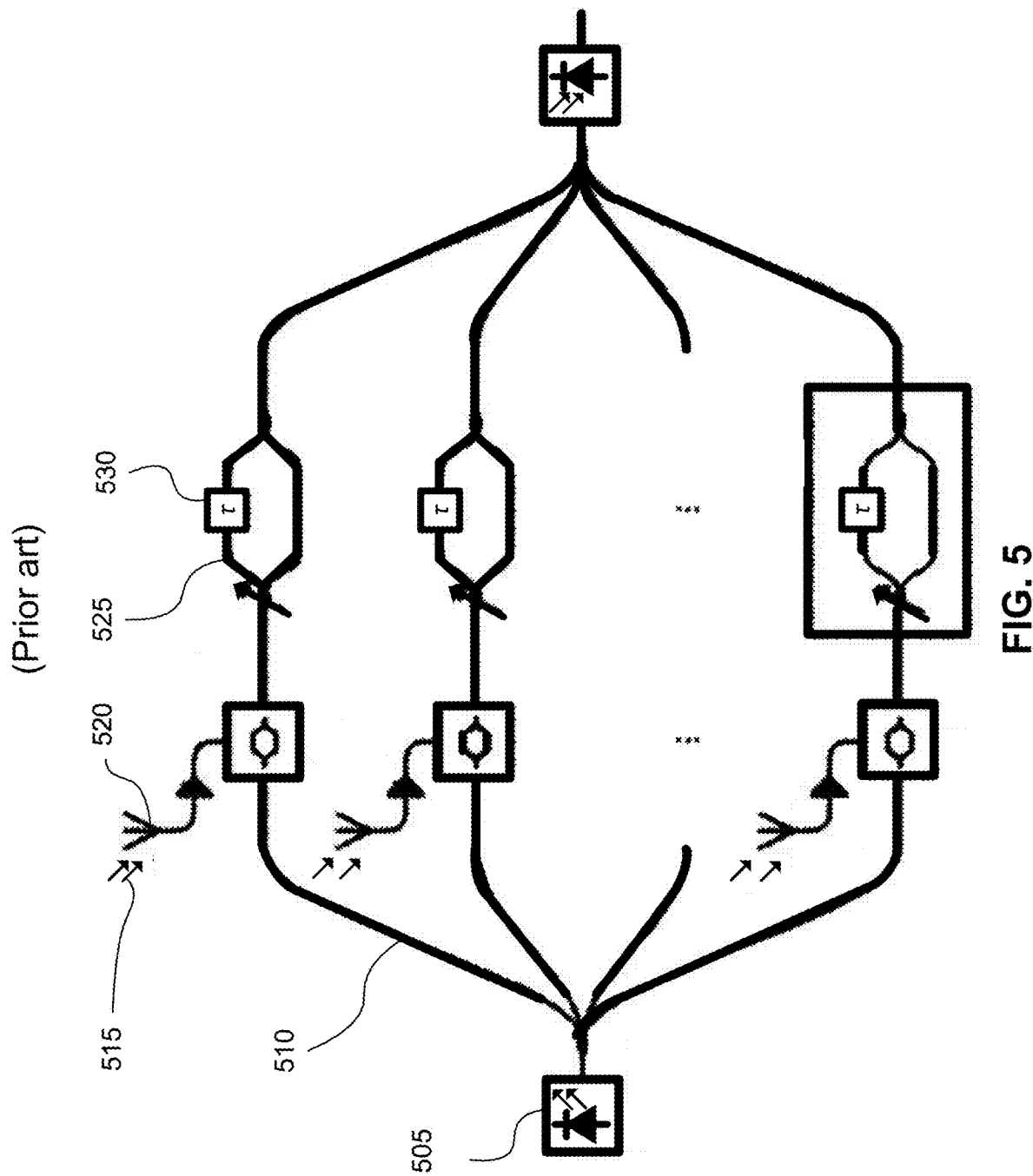
FIG. 5 shows a prior art photonics-based architecture that includes Mach Zehnder modulators.

FIG. 5 illustrates a photonics-based architecture with MZMs operative to apply phase shifting to distinct propagation paths, according to prior art. A carrier wave from an emitter 505 can be split into a plurality of paths 510. The carrier wave in each path can be modulated in accordance with a signal 515 received from an antenna element 520, and an MZM 525 can apply a true time delay $\tau$ 530.

An alternative to phase shifting with a true time delay is to perform phase shifting with an electronically tunable, optical add-drop filter, such as a modulated microring resonators (MRRs). An MRR is a spectral filter having an optical input port, an optical output through port, and an optical output drop port. It filters a central resonance frequency the intensity of which is a function of the optical input and an electrical input weight which can apply a phase shift to the signal. The through port output and drop port output intensities are complementary Lorentzian-shaped transfer functions of the optical input and the electrical input weight. Through complex Cartesian modulation, phase shifts required for beamforming applications can be applied.

A differential detection of the through and drop port outputs from the MRRs produces a photocurrent representing the subtraction of the drop port output from the through port output, and results in a normalized weight between [−1,1] of the input signal. The result depends on the resonant peak of the MRR relative to the wavelength of the optical input signal. This effectively implements a multiplication operation between the electrical input weight and the optical input signal. By having a series (a "bank") of MRRs corresponding to different carrier wavelengths and independent weights, an optical input signal encoding vector elements on a set of wavelength-division multiplexed carriers can be processed and a differential detection can result in a multiply-and-accumulate operation (i.e., a dot product).

Figure 6:
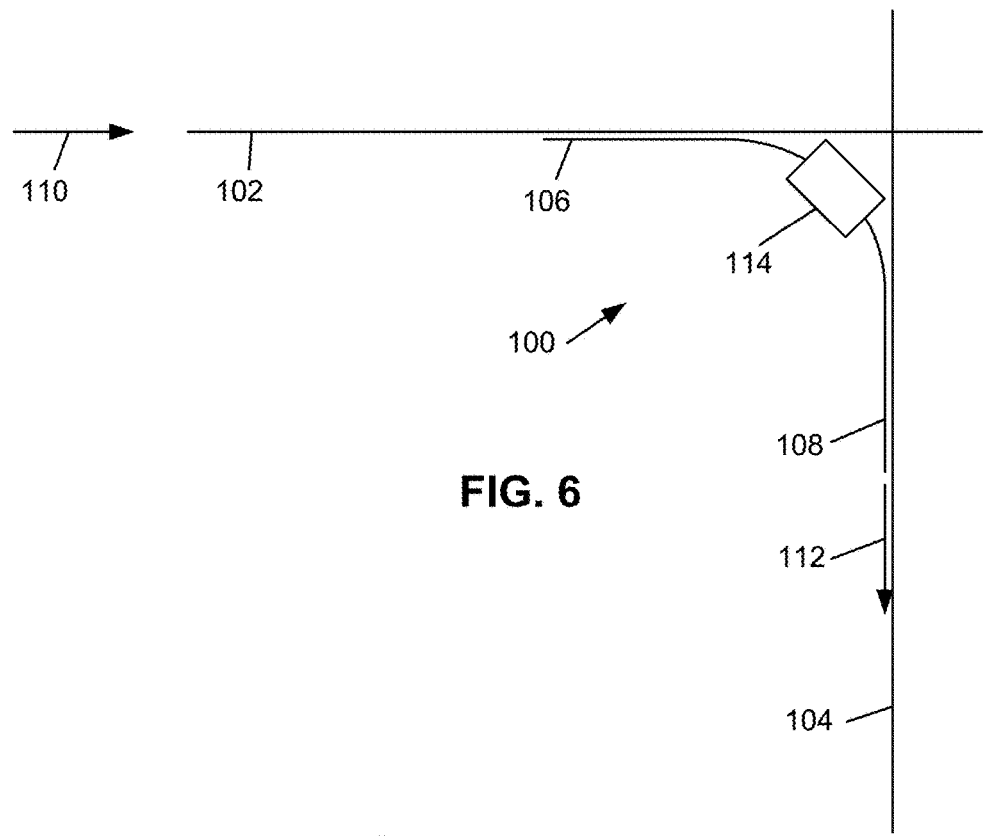
FIG. 6 shows an embodiment of a PCM coupler in accordance with an embodiment of the present disclosure.

As will be described below, the present disclosure provides photonic based embodiments of beamformers that include a crossbar array of phase-change material (PCM) couplers. FIG. 6 shows an embodiment of a single PCM coupler 100 coupled to a first waveguide 102 and to a second waveguide 104. The PCM coupler has an input waveguide 106 coupled to the first waveguide 102 and an output waveguide 108 coupled to the second waveguide 104. The parameters of the first waveguide 102 and of the input waveguide 106 can be selected to couple a fixed portion of an optical signal travelling in the first waveguide 102 in the direction indicated by the arrow 110 to the input waveguide 106. For example, the parameters of the first waveguide 102 and of the input waveguide 106 can be selected to couple, for light in a specific wavelength range, 25%, or any other suitable portion, of the light travelling in the first waveguide 102, in the direction 110, to the input waveguide 106. The parameters of the second waveguide 104 and of the output waveguide 108 can be selected to couple a fixed portion, e.g., 100%, of an optical signal travelling in the output waveguide 108 in the direction indicated by the arrow 112 to the second waveguide 108. The PCM coupler 100 also comprises a PCM cell 114 configured to optically couple the input waveguide 106 to the output waveguide 108. The PCM cell 114 is configured to manipulate the coupled portion of the input optical signal according to an optical property or properties of a PCM memory element comprised in the PCM cell 114. The optical properties may be previously programmed into the PCM memory element and may correspond to the current persistent state of the PCM memory element. The manipulation of the coupled portion of the input optical signal can be in the form of an attenuation, absorption, or optical transmittance action of the mixed-mode PCM memory element, according to current optical properties of the PCM memory element, for example. The PCM cell 114 produces an output, which is an optical signal, typically an attenuated version or a portion of the portion of the input optical signal that was received by the PCM cell 114. The PCM cell 114 can be evanescently coupled to an optical waveguide structure. The PCM cell 114 may modify the transmission, reflection, or absorption characteristic of the waveguide structure dependent on its state. The PCM cell 114 may also be referred to as a PCM element.

A phase change material is a type of material that can be in different phases such as an amorphous phase and a crystalline state. Some phase change materials allow PCM cells to be controlled electrically and/or optically to vary and to set a ratio of amorphous to crystalline material of the PCM cells. A PCM cell can allow low-loss light transmission and strong light-matter interaction in a compact footprint. In particular, electrically controlling a PCM cell can cause a change in the optical transmission of the PCM cell. In a crystalline state, PCM transmission is low, and in an amorphous state, transmission is high. Intermediate transmission states result from different ratios of amorphous and crystalline parts of the PCM cell.

Practically, PCM cells may be used as non-volatile memory that can be used for data storage. Electrical and/or optical control of a PCM cell can also cause its conductivity to increase or decrease. In some embodiments, PCM conductivity may also be much higher and more stable than that of other electrical switches. In other embodiments, the PCM cell may suffer from drift issue, so the resistance/conductivity changes with time. However, as will be understood by the skilled workers, there may be ways to mitigate that. A network of PCM cells can therefore act as a network of artificial synaptic devices capable of storing and processing information at the same location such to allow in-memory computation.

An optical transmission of the PCM cell 114 can be controlled electrically by applying an electrical signal to electrodes formed on the PCM cell 114. The PCM cell 114 may be a plasmonic nanogap PCM cell whose transmission coefficient varies in accordance with the fraction of amorphous material and the fraction of crystalline material present in the PCM cell. The fraction of amorphous material and the fraction of crystalline material are controlled electrically. The material of which the PCM cell is made may be, for example, germanium-antimony-tellurium (i.e. GeSbTe or GST), arsenic trisulfide ($As_2S_3$), vanadium dioxide ($VO_2$), antimony telluride ($Sb_2Te_2$), antimony sulfide ($Sb_2S_3$), or any other suitable material. Both electrical and optical non-volatile switching may be enabled, and a PCM state can be observed with either an electrical or optical readout. Combining plasmonics with PCMs into a device may satisfy stringent requirements, because the dimensions of such devices can be reduced to tens of nanometers and smaller, significantly below the diffraction limit of traditional optical devices. Nanoscale dimensions and strong field confinement of a plasmonic nanogap may facilitate both electrical and optical non-volatile switching of GST within the gap, allowing for full mixed-mode operation of a PCM memory cell leading to low-loss light delivery and strong light-matter interaction in a compact footprint. In addition, the extremely high field enhancement possible with subwavelength nanogaps may enable high-sensitivity spectral measurement.

Figure 7:
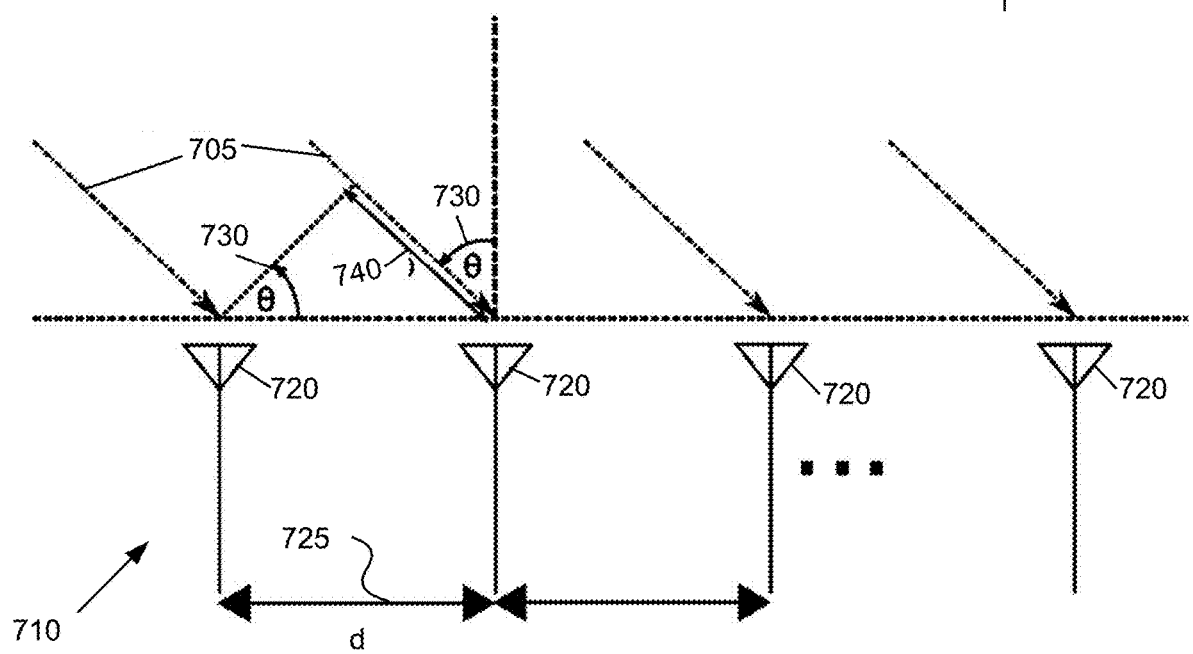
FIG. 7 illustrates a phased array of antennas, receiving a radio frequency (RF) signal, according to an embodiment of the present disclosure.

FIG. 7 illustrates a phased array 710 of antenna elements 720, receiving an RF signal 705, according to an embodiment of the present disclosure. The RF signal 705 can be received by the array 710 of antenna elements 720, where each antenna element l (l=1, 2, 3, ... ) 720 is separated from a neighboring antenna element by a distance d 725.

As will be understood by the skilled worker, an RF wave with amplitude A, frequency $f_{RF}$, and phase $\varphi$, received by an antenna element, can be denoted by a wave function x(t):

$$x(t) = A \cos(2\pi f_{RF} t + \varphi).$$

The RF wave is also characterized by a central wavelength $\lambda_{RF}$ corresponding to the carrier frequency $f_{RF}$, and an angle of arrival of $\theta$ 630. If adjacent antenna elements are spaced apart by a distance d, the phase difference $\Delta\varphi$ between RF waves at two adjacent antenna elements 720 is a multiple m of a wave cycle d sin $\theta$ 740:

$$\Delta\varphi = md \sin\theta$$
$$\Delta\varphi = 2\pi \frac{d \sin\theta}{\lambda_{RF}}$$

At an antenna 1 720, the RF wave received can be expressed as y(t):

$$y(t) = A \cos[2\pi f_{RF} t + \varphi + (l-1)\Delta\varphi]$$

Accordingly, it is possible to reconstruct the RF signal 705 received at the antenna array by phase shifting the RF wave received at each of the $l^{th}$ antenna by $(l-1)\Delta\varphi$ and combining constructively the phase shifted RF waves received.

Generally, for a beamforming system that has baseband digital beamformer, an analog beamformer, RF chains coupling the baseband digital beamformer to the analog beamformer, and a plurality of antennas, the signal received or emitted by one of the antennas can be expressed as:

$$y = H^H F_{RF} F_{BB} Ps + n$$

Where $H^H$ denotes the conjugate transpose of the channel matrix, $F_{RF}$ denotes the analog part of the beamformer, $F_{BB}$ denotes the digital (baseband) part of the beamformer, P is a matrix that indicates the power constraint of the transmitter, s is the signal to be transmitted and n is the noise at the antenna.

In an aspect of the present disclosure, $F_{RF}$ may be considered to depend only on the long-term stochastics of the channel, $F_{RF}$ does not need to be updated for each individual channel realization and as discussed below, $F_{RF}$ can exploit in-memory computing based on non-volatile phase change material cells.

In an embodiment of the present disclosure, phase shifting may be realized through complex Cartesian weights. In this approach, a desired phase change $\varphi_{lk}$, for the signal related to the $k^{th}$ data stream received from the $l^{th}$ antenna, is realized by separately multiplying the received signal with two scalars $A_{lk}^r$ and $A_{lk}^i$ such that elements of the matrix $F_{RF}$ representing all the antennas l and all data streams k can be expressed as:

$$\{F_{RF}\}_{lk}=e^{j\varphi_{lk}}=A_{lk}^r+jA_{lk}^i$$

$$\{F_{RF}\}_{lk}=\cos\varphi_{lk}+j\sin\varphi_{lk}$$

where:

$$\varphi_{lk}=\tan^{-1}\left(\frac{A_{lk}^i}{A_{lk}^r}\right)$$

and:

$$\sqrt{A_{lk}^{r^2}+A_{lk}^{i^2}}=1$$

Figure 8:
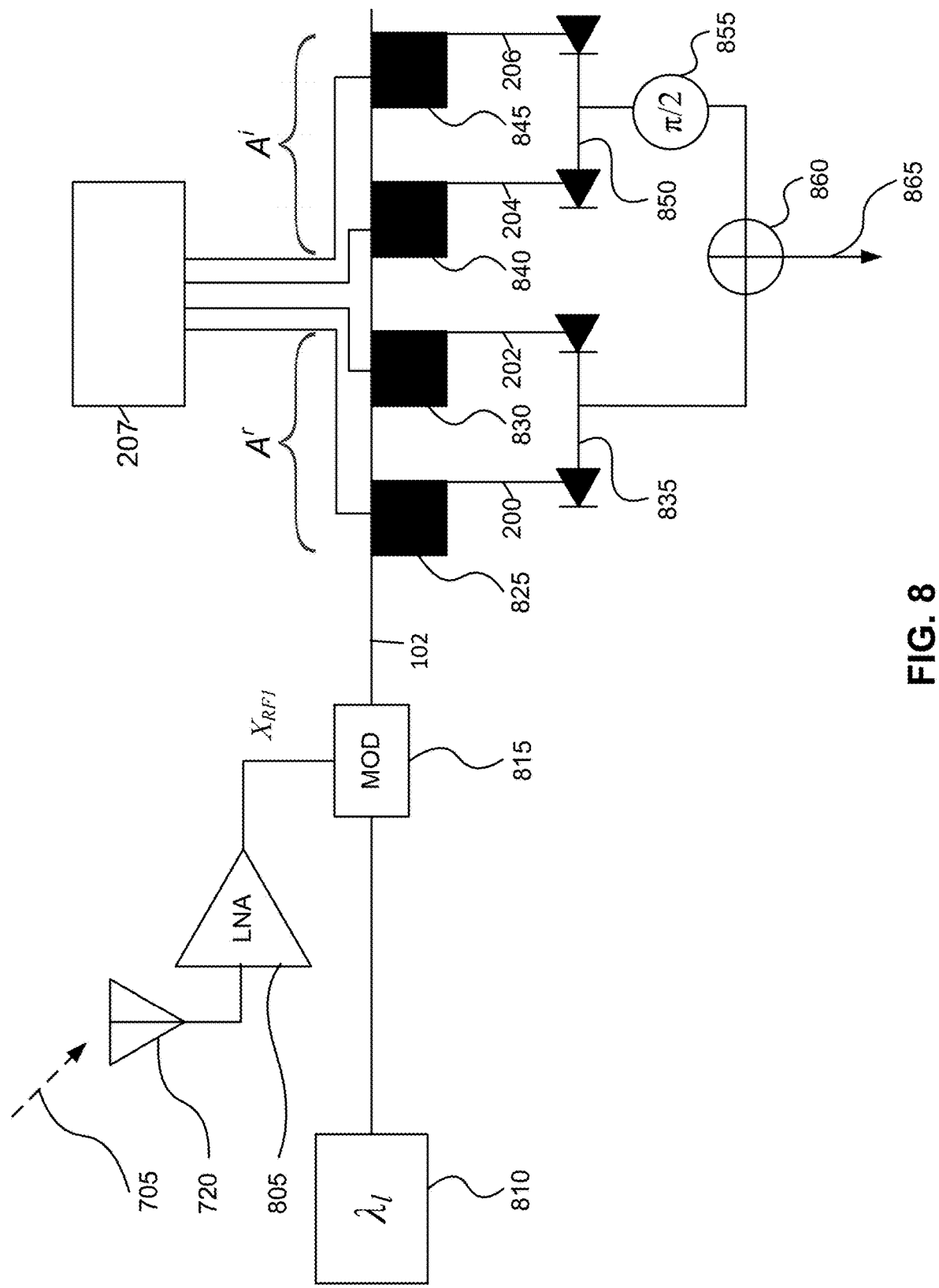
FIG. 8 shows a photonic circuit that includes an array of four PCM couplers, in accordance with an embodiment of the present disclosure.

As described in relation to the embodiment of the present disclosure shown at FIG. 8, $A_{lk}^r$ and $A_{lk}^i$ can be set and the associated phase change can be applied to a signal through a photonic circuit that implements complex Cartesian weighting. FIG. 8 shows a photonic circuit that includes an array of four PCM couplers 825, 830, 840 and 845, configured to apply a phase shift to a modulated carrier signal, according to an embodiment of the present disclosure. As will be understood by the skilled worker, $X_{RFl}$ represents a signal (amplitude and phase), received from antenna element l and amplified. Each of the PCM couplers 825, 830, 840 and 845 is coupled to a first waveguide 102. The PCM couplers 825, 830, 840 and 845 may be like the PCM coupler 100 shown at FIG. 6. The PCM coupler 825 couples the first waveguide 102 to a second waveguide 200, the PCM coupler 830 couples the first waveguide to a third waveguide 202, the PCM coupler 840 couples the first waveguide 102 to a fourth waveguide 204, and the PCM coupler 845 couples the first waveguide to a fifth waveguide 206. A controller 207 is coupled to each PCM cell of each PCM coupler 825, 830, 840 and 845, and controls the transmission coefficient of each of the PCM cells. An optical carrier signal of wavelength $\lambda_1$ is propagated from a light source 810 to a modulator 815. An RF signal 705 received at an $l^{th}$ antenna element 720 for a data stream k becomes an electronic RF signal $X_{RFl}$ that can be amplified with a low noise amplifier (LNA) 805. The amplified RF signal may then be used to drive the modulator 815, which modulates the optical carrier signal to produce a modulated carrier signal. The PCM couplers 825, 830, 840 and 845 may be configured to couple any suitable amount of light from the first waveguide 102 into the waveguides 200, 202, 204 and 205. For example, the PCM couplers 825, 830, 840 and 845 may be configured to couple a same of amount of light into the waveguides 200, 202, 204 and 205.

The modulated carrier signal propagates in the first waveguide 102 and is coupled to the second waveguide 200, the third waveguide 202, the fourth waveguide 204 and the fifth waveguide 206 in accordance with the PCM couplers 825, 830, 840 and 845 respectively. The optical signal output from the second waveguide 200 and from the third waveguide 202 are received at a balanced photodetector 835, which outputs an electrical signal commensurate with the intensity difference between the optical signal output from the second waveguide 200 and the optical signal output from the third waveguide 202. As will be understood by the skilled worker, any other suitable optical detector device (ODD) that produces a balanced photo-detection output may be used. The optical signal output from the fourth waveguide 204 and from the fifth waveguide 206 are received at a balanced photodetector 850, which outputs an electrical signal commensurate with the intensity difference between the optical signal output from the fourth waveguide 204 and the optical signal output from the fifth waveguide 206. The coupling efficiency of any of the PCM couplers 825, 830, 840 and 845 to the first waveguide and to the respective one of the second waveguide 200, the third waveguide 202, the fourth waveguide 204 and the fifth waveguide 206, and the settings of the controller 207, control the value of the signal measured at each of the balanced photodetectors 835 and 850. By calibrating the controller 207, the PCM couplers 825, 830, 840 and 845, and the balanced photodetectors 835 and 850, it is possible to realize an output at the balanced photodetector 835 that ranges from −1 to +1, and to realize an output that ranges from −1 to +1 at the balanced photodetector 850. The output at the balanced photodetector 835 and the output at the balanced photodetector 850 can thus be configured to be analogous to the pair ($A_{lk}^r$, $A_{lk}^i$) and controlling $A_{lk}^r$ and $A_{lk}^i$ effectively controls a phase change imparted to the optical representation of the RF signal 705 received at the $l^{th}$ antenna element 720. Phase shifting, with a phase shifter 855, the output from the balanced photodetector 850 by 900 and adding the resulting phase shifted output to the output from the balanced photodetector 835 effectively produces a phase shifted electrical signal, the phase shift being equal to $$\varphi_{lk}=\tan^{-1}\left(\frac{A_{lk}^i}{A_{lk}^r}\right)=\arctan\mathrm{gent}\left(\frac{A_{lk}^i}{A_{lk}^r}\right)$$

Thus, in embodiments of the present disclosure, two pairs of PCM couplers (four PCM couplers) can be configured and controlled to each generate a weight within a range of [−1,1], hence they can be used to generate the real part $A_{lk}^r=\cos\varphi_{lk}$ and the imaginary part $A_{lk}^i=\sin\varphi_{lk}$ of the complex number that represents a phase $\varphi_{lk}$ of a signal.

Figure 9:
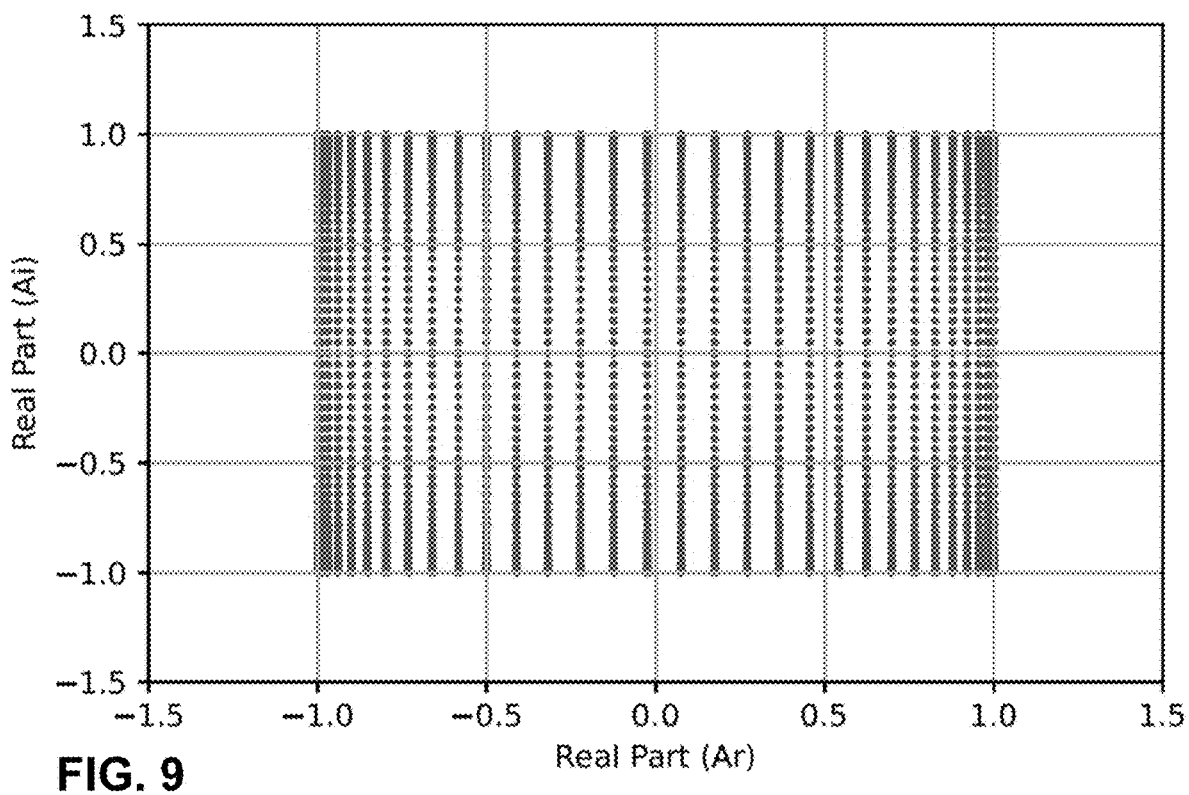
FIG. 9 illustrates the range of weights that can be realized by PCM cells arranged in a crossbar array, according to an embodiment of the present disclosure.

FIG. 9 illustrates an example of a range of weights that can be realized by the arrangement of the PCM cells 825, 830, 840 and 845 of FIG. 8.

Figure 10:
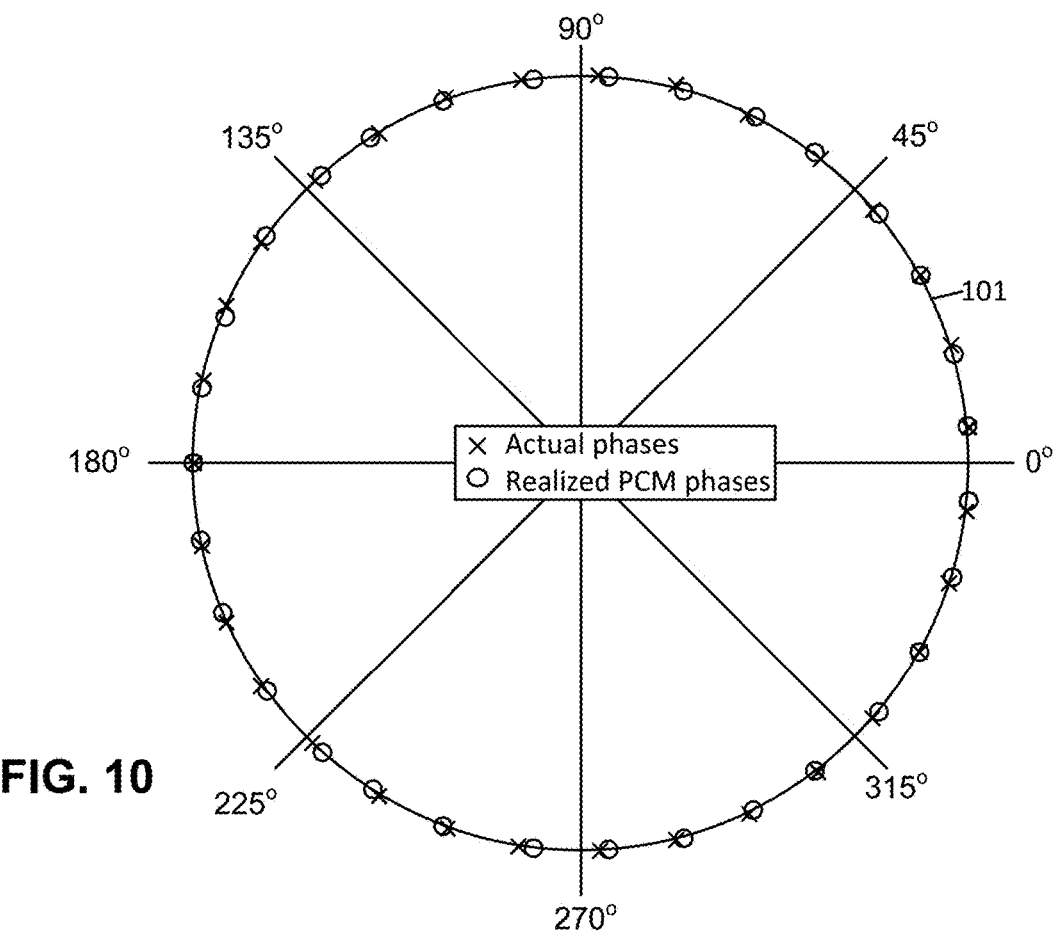
FIG. 10 illustrates the range of phases that can be realized by PCM cells arranged in a crossbar array, according to an embodiment of the present disclosure.

FIG. 10 illustrates the range of phases that can be realized by PCM cells arranged in a crossbar array, according to an embodiment of the present disclosure. The figure shows that phase changes in a range between 0 and 360° can be realized with a crossbar array of PCMs and that expected values are accurate. As shown in FIG. 10, the actual phases and the realized PCM phases value are all substantially on a unit circle 101.

Figure 11:
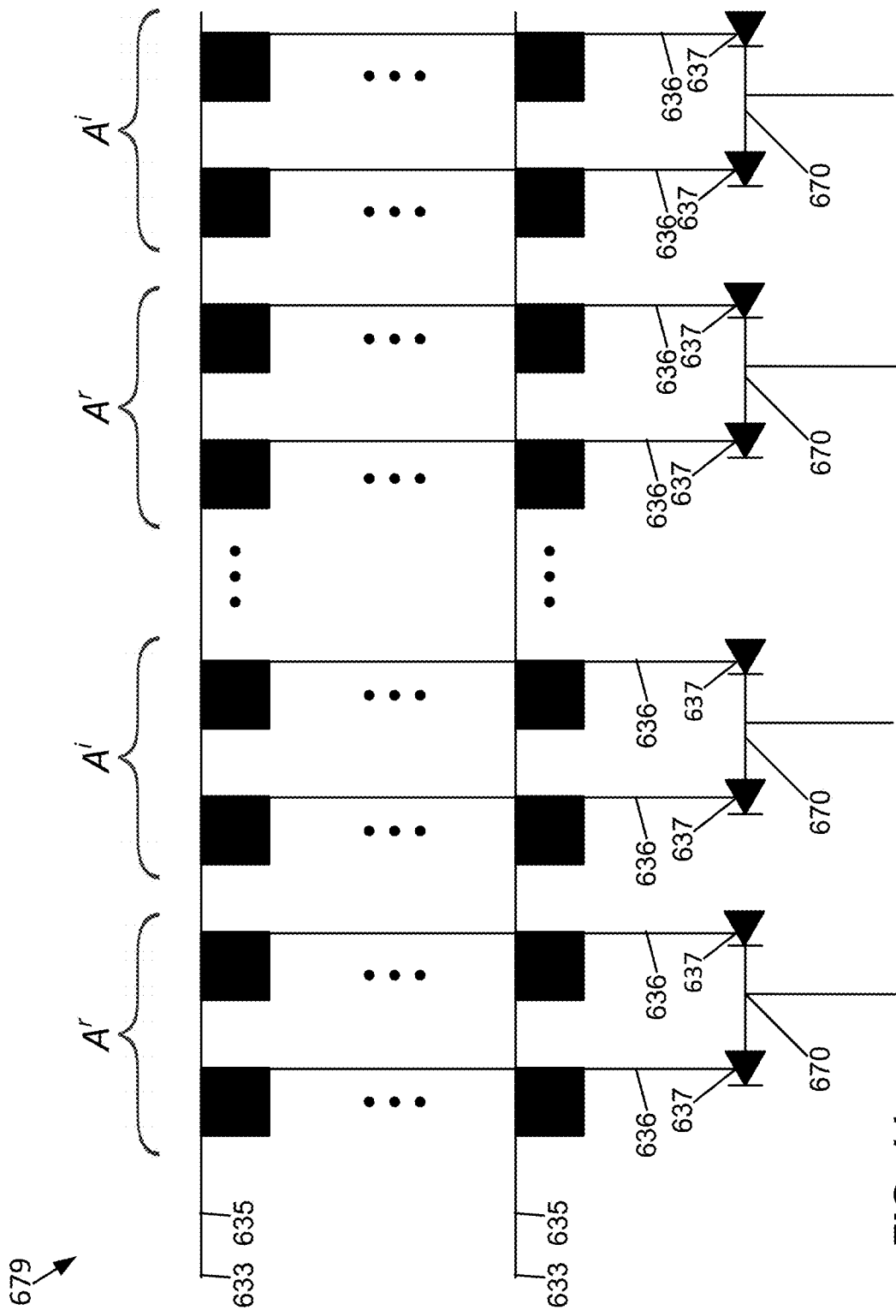
FIG. 11 shows an embodiment a photonic circuit that includes a crossbar array of PCM couplers and waveguides, in accordance with an embodiment of the present disclosure.

FIG. 11 shows an embodiment a photonic circuit that includes a crossbar array 679 of PCM couplers and optical waveguides, configured to apply a phase shift to optical signals, according to an embodiment of the present disclosure. The crossbar array 679 may also be referred to as a photonic Cartesian complex-weighting module. The crossbar array 679 includes a set of m optical waveguides 635 (m is an integer), each configured to receive, at a respective input (or input port) 633, a respective optical signal having a respective wavelength. The crossbar array 679 also comprises a set of n optical waveguides 636 ('n' is an even integer), each of which intersects all the m optical waveguides. The m optical waveguides and the n optical waveguides may be in a same plane. The crossbar array 679 further comprises PCM couplers 640, each of which is formed (located) at an intersection of one of the m optical waveguides 635 and one of the n optical waveguides. The PCM couplers 640 are configured to couple the optical signal propagating along any of the m optical waveguides 635 into each of the n optical waveguides. Each optical signal is propagated by a respective waveguide 635 and split off into the n vertical waveguided by the PCM couplers 640 along the particular waveguide. The optical waveguides 635 may be referred to as first optical waveguides and the optical waveguides 636 may be referred to as second optical waveguides. The crossbar array includes n/2 balanced photodetectors 670 (one balanced photodetector for each pair of vertical waveguides) configured to receive light from the outputs (or output ports) 637 of the second optical waveguides. A controller (not shown) may be coupled to each PCM coupler 640 and may be configured to control the transmission coefficient of the PCM cell of each of the PCM couplers in accordance with pre-determined phase shifts.

The crossbar array 679 of FIG. 11 may be used in embodiments of uplink beamforming systems in accordance with the present disclosure. The crossbar array 679 of FIG. 11 may also be used in embodiments of downlink beamforming systems in accordance with the present disclosure.

Figure 12:
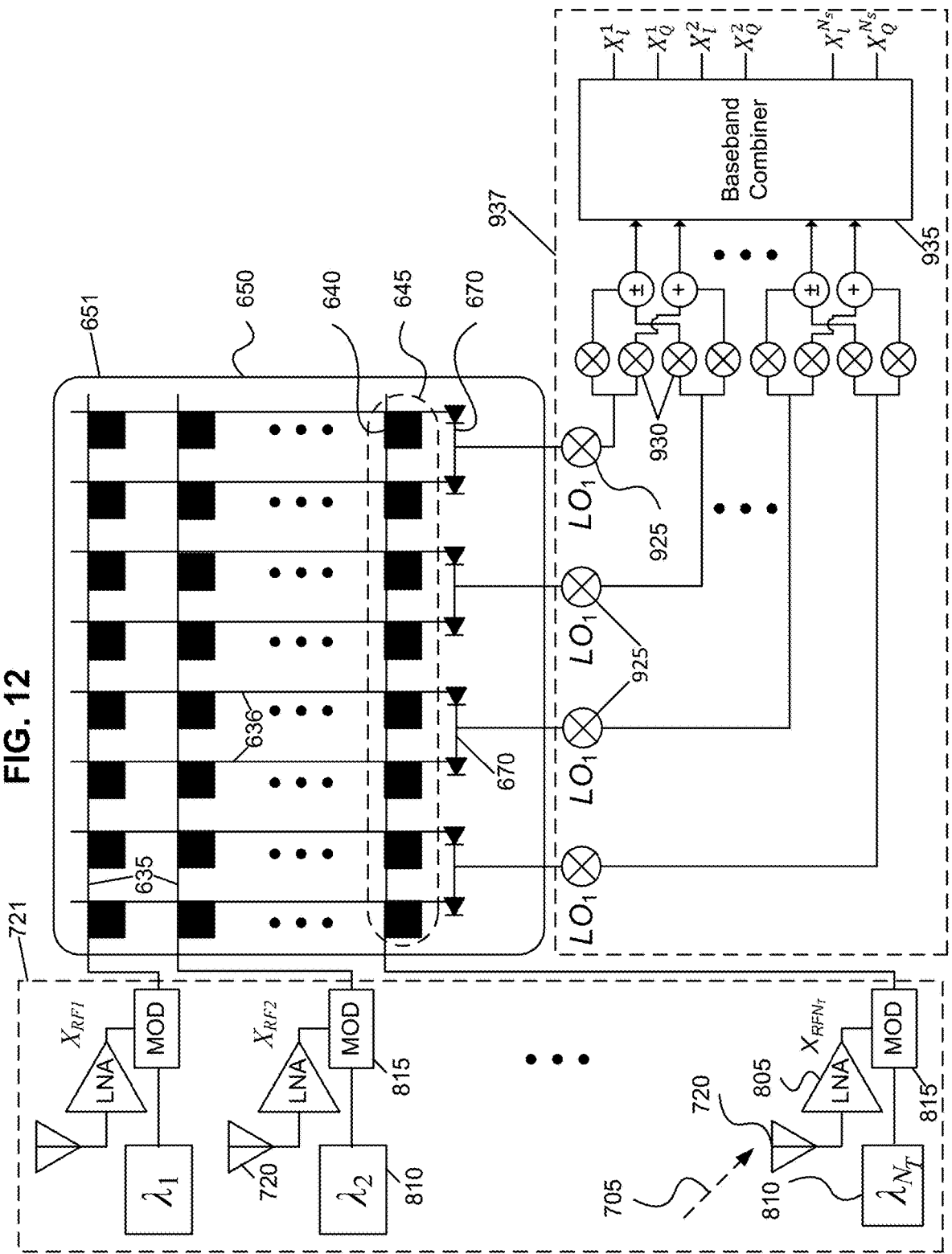
FIG. 12 shows an embodiment of a two-stage uplink beamforming (combiner) system in accordance with the present disclosure.

FIG. 12 shows an embodiment of a two-stage uplink beamforming system in accordance with the present disclosure. The system shown at FIG. 12 may also be referred to as a signal processing system for wireless communication. The system of FIG. 12 has a crossbar array 650 of PCM couplers 640, which may be referred to as a photonic Cartesian complex-weighting module 651. The system may receive an RF signal 705 at each of its NT antenna elements 720, which may be referred to simply as antennas. After reception by an antenna element 720, the received RF signal may be amplified by a low-noise amplifier (LNA) 805 and modulated onto an optical carrier wave from a respective light source (optical carrier wave source) 810, via a modulator 815 to obtain an optical signal. In this embodiment, the antenna elements 720, the light sources 710, the modulators 815 and the LNAs 805 may be said to form part of an input module 721. The input module 721 may be said to be coupled to the photonic Cartesian complex-weighting module 651 to provide each respective optical signal to a respective optical waveguide 635.

Each modulated optical carrier wave (optical signal) of the NT carrier waves (optical signals) propagates along a respective (horizontal) optical waveguide 635 and is coupled, by a respective PCM coupler 640, to at least four other (vertical) optical waveguides 636. Each PCM coupler 640 is connected (coupled) to a controller (not shown), which controls the optical transmission of the PCM element (PCM cell) of the PCM coupler 640, thereby applying a weight to the intensity of the optical signal passing through each PCM coupler 640. Each sequential pair of weighted optical signals may be output to a same balanced photodetector 670 or to any other suitable optical detector device. The balanced photodetector 670 thus receives a first sum of NT weighted optical signals and a second sum of NT weighted optical signals. Each balanced photodetector 670 outputs the difference in intensity between the first sum of NT weighted carrier waves and the second sum of NT weighted carrier waves. For the same (horizontal) optical waveguide 635 that propagates an original optical signal, the next four PCM couplers 640 couple, to the next four (vertical) optical waveguides 636, the optical signal with another set of four weights, which realizes another phase shift. The same scenario applies for an optical signal having a different wavelength and propagating in a different (horizontal) optical waveguide 635. Each balanced photodetector 670 can incoherently receive and sum the real (in-phase) parts of signals at all wavelengths of the system, or the imaginary (quadrature) parts of signal at all wavelengths of the system, i.e., a pair of columns of the crossbar array 650, representing the total positive and total negative part of either a real or imaginary number. The balanced photodetectors 670 and the PCM couplers 640 can be calibrated to have the balanced photodetectors generate an output value comprised between −1 and +1. Together, two adjacent balanced photodetectors 670 may thus be configured to generate the real and imaginary components of the complex number:

$$e^{j\varphi_{lk}} = A_{lk}^r + jA_{lk}^i.$$

The balanced photodetectors 670 output a detector electrical signal (e.g., a photocurrent) that may be down-converted by a local oscillator 925 ($LO_1$) configured as a down-converter. Further local oscillators 930 can be configured and used to allow a baseband combiner 935 to realize an in-phase component $X_I^1$ and a quadrature component $X_Q^2$. The baseband combiner 935 may produce an in-phase component $X_I^1$ and a quadrature component $X_Q^1$, in accordance with corresponding to the phase applied by four PCMs 640.

By utilizing a crossbar array 650 of PCMs as the analog part of a beamformer, long-term stochastics of a channel may be stored with little to no power consumption as states of the PCMs 640.

In this embodiment, the local oscillators 925 and 930, and the baseband combiner 935 may be considered as being part of an output module 937 configured to process the electrical signal output by the balanced photodetectors 670.

Figure 13:
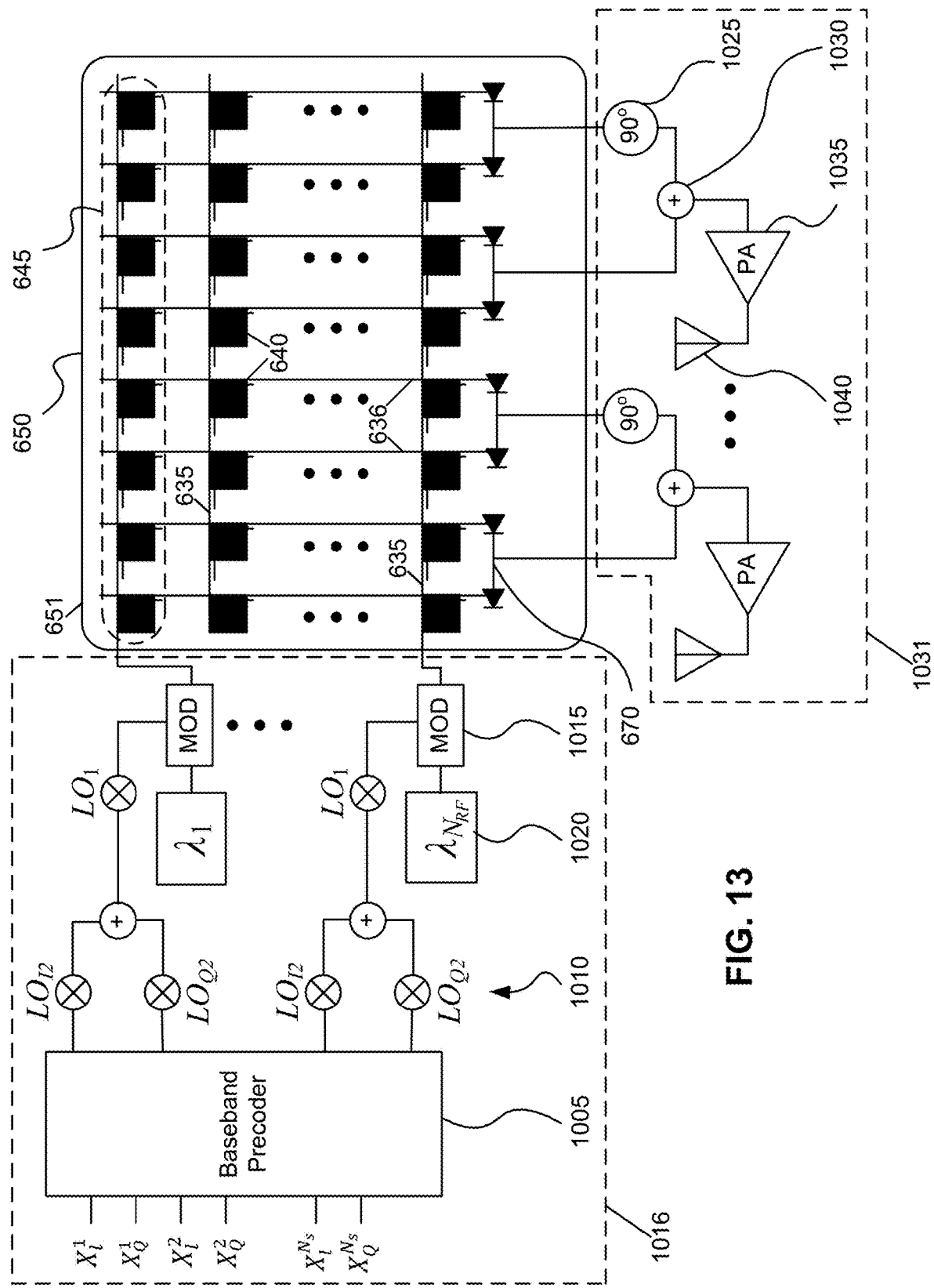
FIG. 13 shows a two-stage PCM-based beamforming system with a precoder in a downlink scenario, according to an embodiment of the present disclosure.

FIG. 13 shows a two-stage PCM-based beamforming system with a baseband precoder 1005 in a downlink scenario, according to an embodiment of the present disclosure. Ns data streams ($X^{N_s}$) may be described as having an in-phase component $X_I^{N_s}$ and a quadrature component $X_Q^{N_s}$, which can be processed by the baseband precoder 1005, and up-converted by local oscillators 1010 configured as up-converters to allow a modulator 1015 to impart the data stream $X^{N_s}$ to an optical signal having a wavelength $\lambda_{N_{RF}}$, originating from light source 1020. The system shown at FIG. 13 may also be referred to as a signal processing system for wireless communication. In the present embodiment, the optical signals are provided to the optical waveguides 635 of the photonic Cartesian complex-weighting module 651. In the present embodiment, the baseband precoder 1005, the local oscillators 1010, the optical sources 1020 and the modulators 1015 may be said to be part on an input module 1016.

Each modulated carrier wave (optical signal) may include the in-phase component and the quadrature component and be split into a multiple of four components (4, 8, 12, or another multiple of 4), each component for having its amplitude modulated according to the transmission settings of a respective PCM coupler 640. The transmission of the PCM cells of the PCM couplers 640 may be controlled by a controller coupled to the PCM couplers 640 to realize the real part and the imaginary part of a complex number defining the phase.

A plurality of different optical signals (data streams to be transmitted) may be processed by a plurality of respective rows 645 of the crossbar array 650. Each row 645 may produce at least one complex number and two balanced photodetectors 670 can sum the complex numbers from different rows to generate two electric signals (e.g., two photocurrents): one detector electrical signal (photocurrent)

for the in-phase (real) part and another detector electrical signal for the quadrature (imaginary) part. The quadrature part can be phase-shifted by 90 degrees (i.e. 90° or π/2 radians) by a phase shifter 1025 (ninety-degree phase shifter). The in-phase component and the 90° phase-shifted version of the quadrature component can be combined, to form a combined detector electrical signal, by an adder 1030, be amplified with a power amplifier (PA) 1035 and be emitted with a respective antenna element 1040. The array of antenna elements emits a signal in a direction according to the phases applied by PCM couplers 640. The ninety-degree phase shifters (phase shifters 1025), the adders 1030, the power amplifiers 1035 and the antennas 1040 may be said to be part of an output module 1031.

Figure 14:
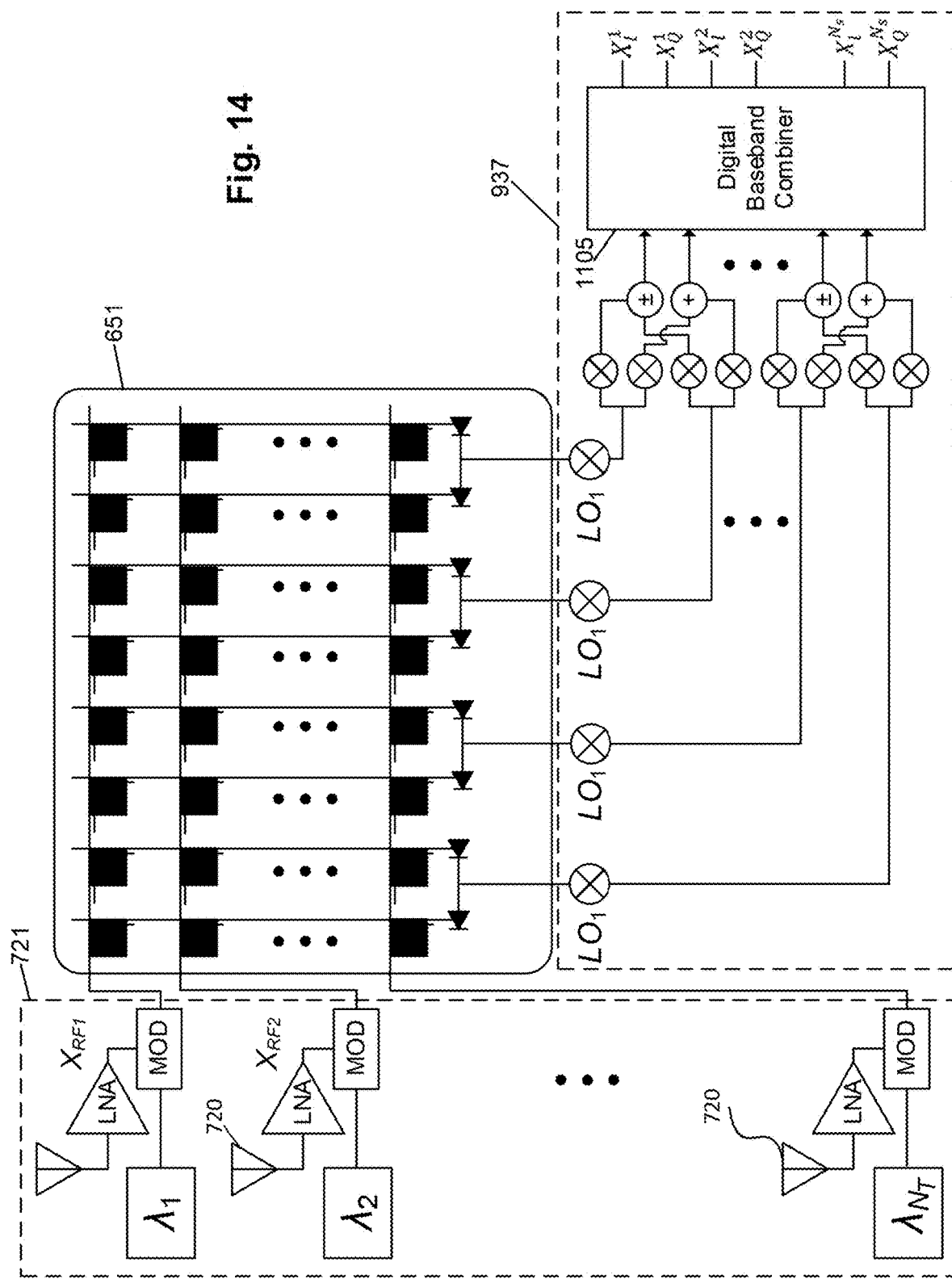
FIG. 14 illustrates an uplink scenario in which a PCM-based beamformer is used with a digital baseband combiner, in accordance with an embodiment of the present disclosure.

FIG. 14 illustrates an uplink scenario in which a PCM-based beamformer according to embodiments is used with a digital baseband combiner. The system of FIG. 14 is substantially the same as the system of FIG. 12, which comprises the input module 721, the photonic Cartesian complex-weighting module 651 and the output module 937, in which the baseband combiner 935 is specifically a digital baseband combiner 1105, as shown in FIG. 14.

Figure 15:
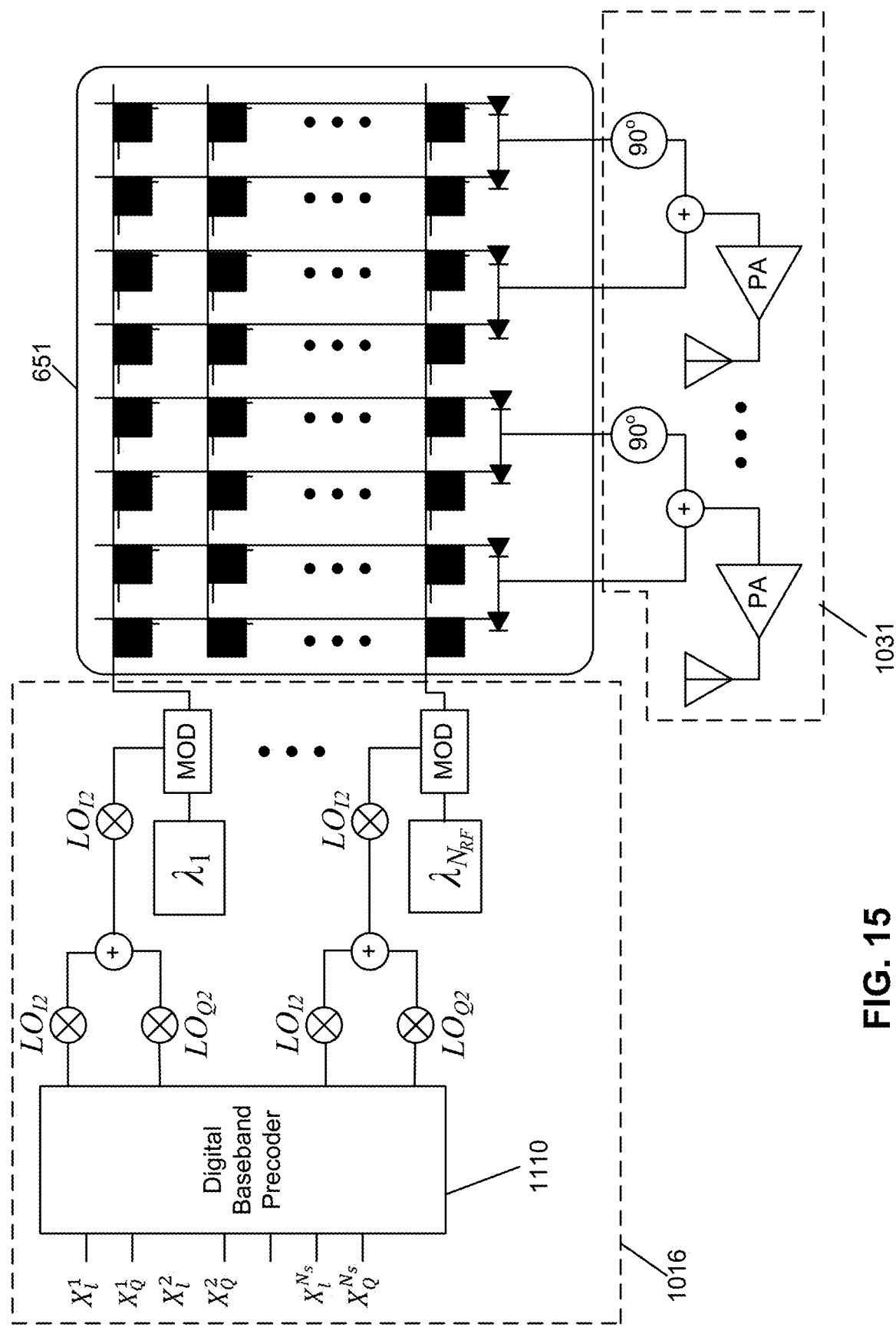
FIG. 15 illustrates a downlink scenario in which a PCM-based beamforming architecture is used with a digital baseband precoder, according to an embodiment of the present disclosure.

FIG. 15 illustrates a downlink scenario in which a PCM-based beamforming architecture according to embodiments is used with a digital baseband precoder. The system shown in FIG. 15 is substantially the same as the system of FIG. 13, in which the baseband precoder 1005 is specifically a digital baseband precoder 1110, as shown in FIG. 15.

Figure 16:
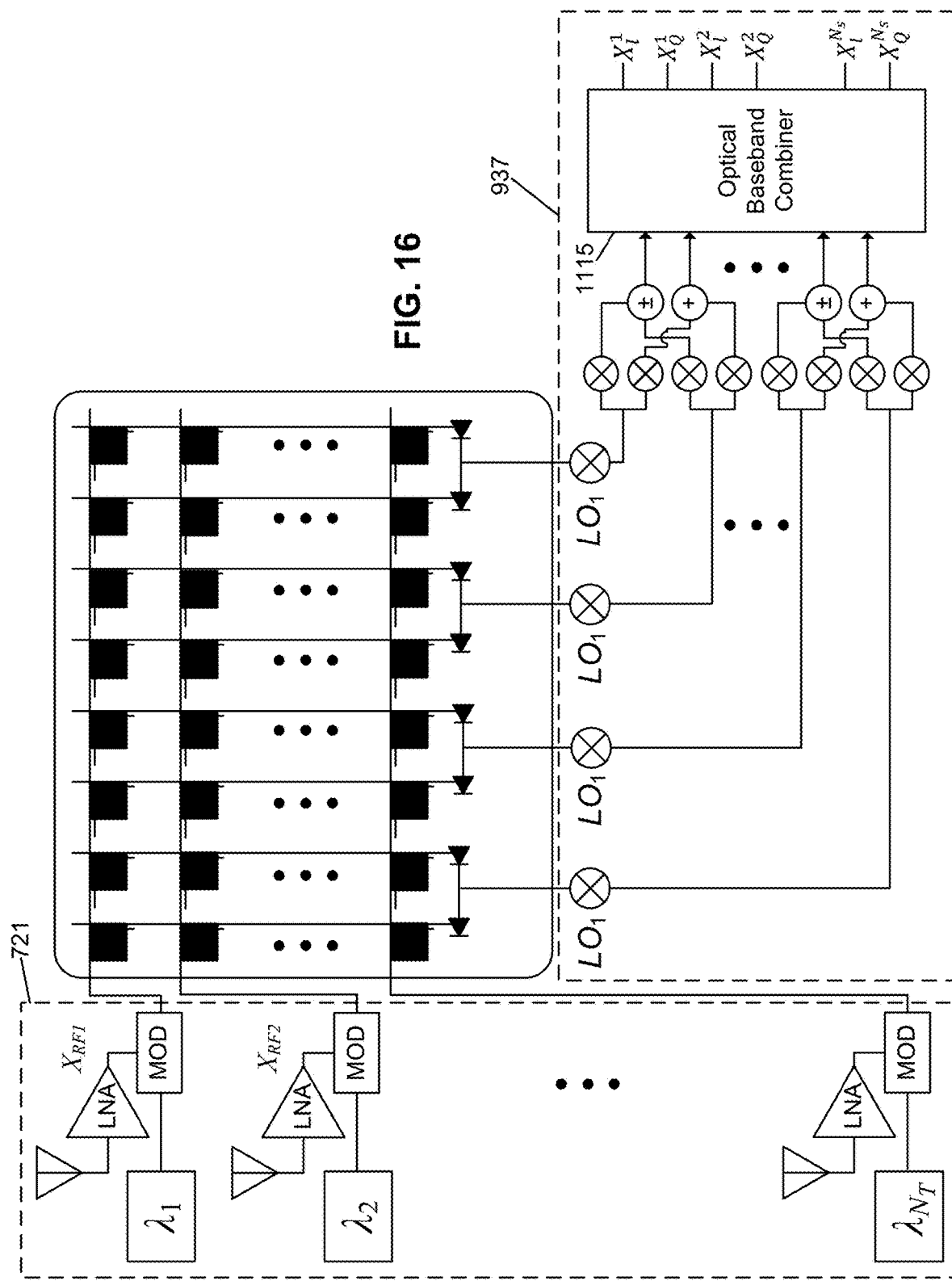
FIG. 16 illustrates an uplink scenario in which a PCM-based beamforming architecture is used with an optical baseband combiner, according to an embodiment of the present disclosure.

FIG. 16 illustrates an uplink scenario in which a PCM-based beamforming architecture according to embodiments is used with an optical baseband combiner. The system of FIG. 14 is substantially the same as the system of FIG. 12, in which the baseband combiner 935 is specifically an optical baseband combiner 1115, as shown in FIG. 16.

Figure 17A:
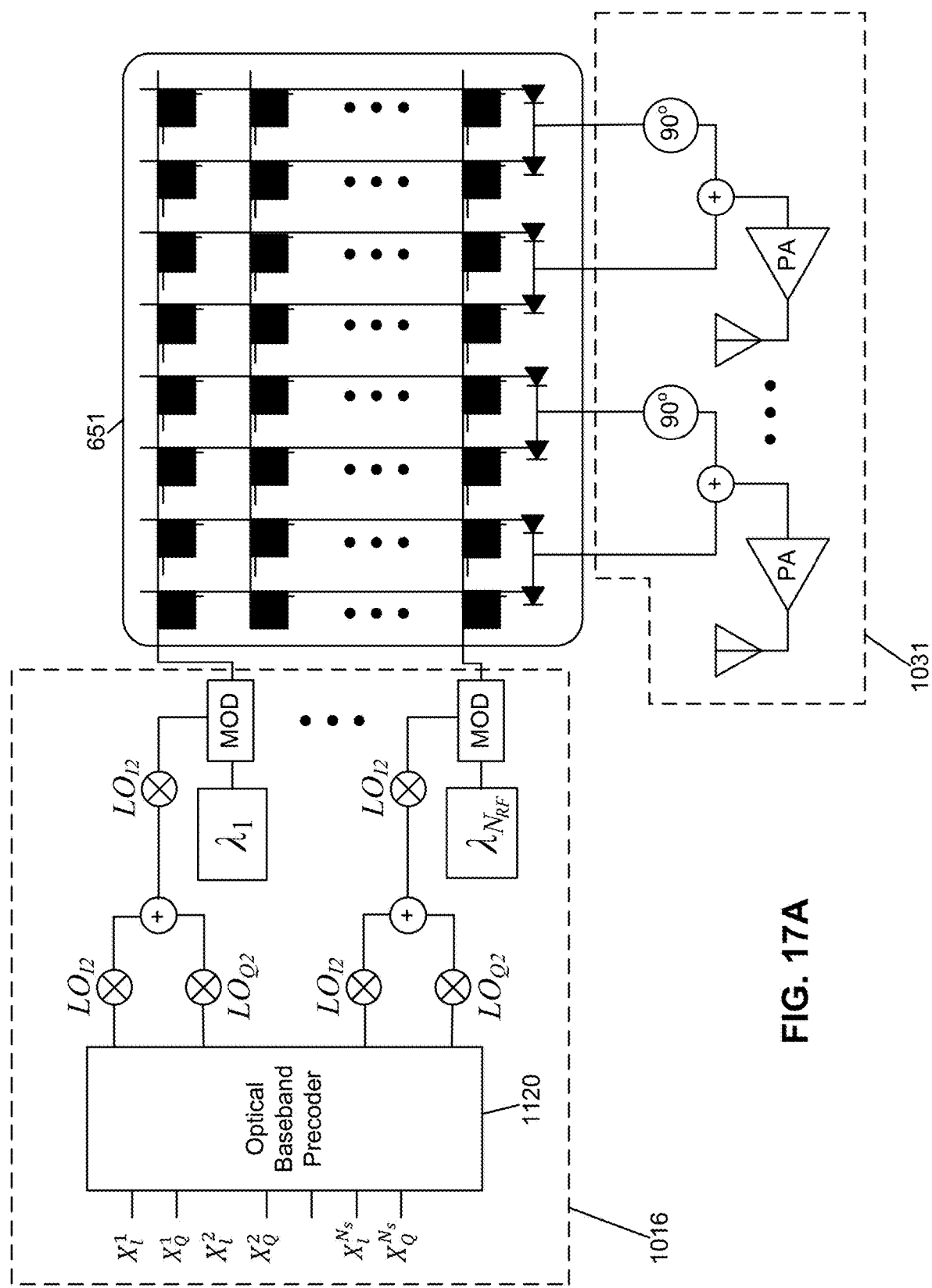
FIG. 17A illustrates a downlink scenario in which a PCM-based beamforming architecture is used with an optical baseband precoder, according to an embodiment of the present disclosure.

FIG. 17A illustrates a downlink scenario in which a PCM-based beamforming architecture according to embodiments is used with an optical baseband precoder. The system shown in FIG. 17A is substantially the same as the system of FIG. 13, in which the baseband precoder 1005 is specifically an optical baseband precoder 1120, as shown in FIG. 17A.

Figure 17B:
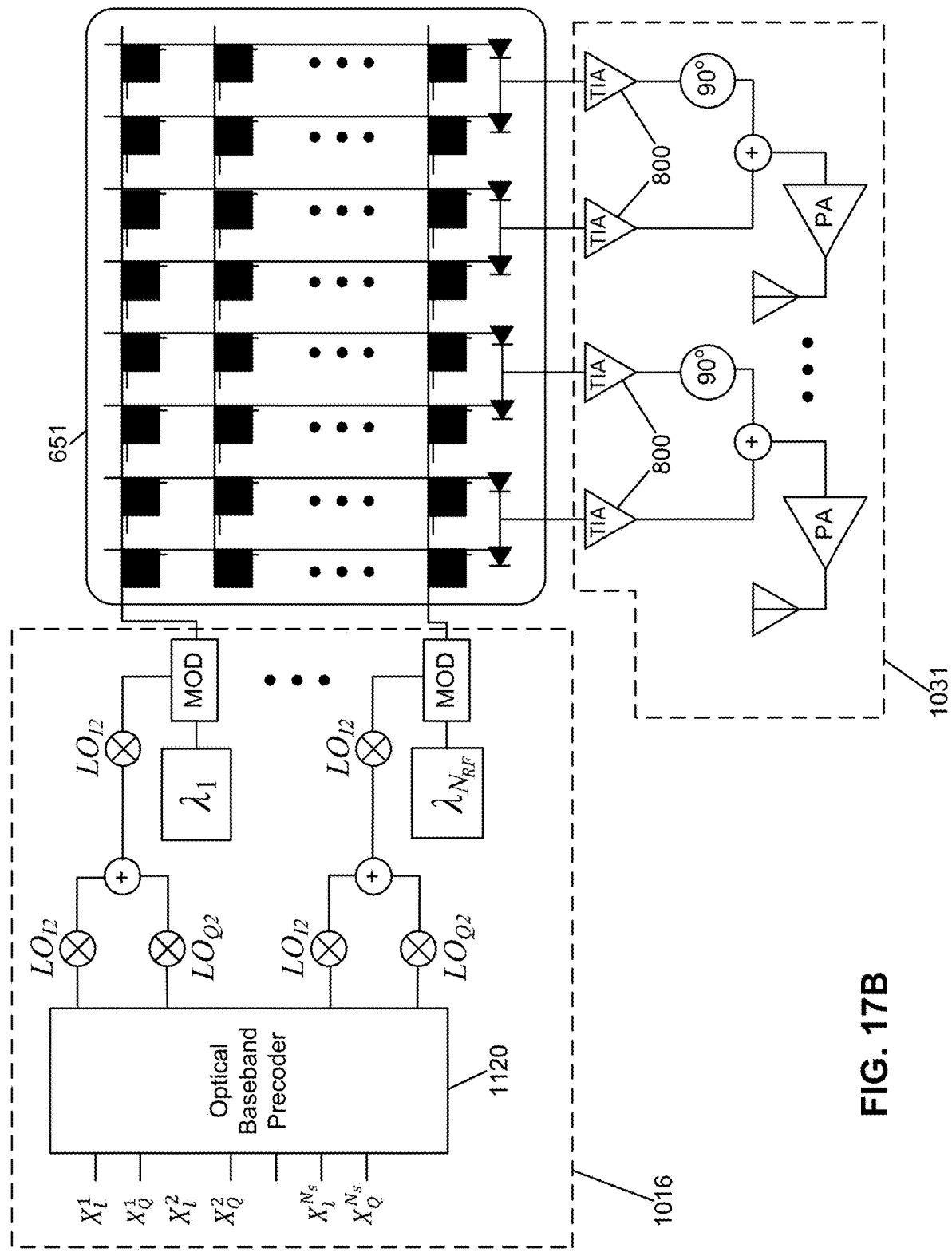
FIG. 17B illustrates another downlink scenario in which a PCM-based beamforming architecture is used with an optical baseband precoder, according to an embodiment of the present disclosure.

FIG. 17B illustrates another downlink scenario in which a PCM-based beamforming architecture according to embodiments is used with an optical baseband precoder. The beamforming architecture shown in FIG. 17B includes the same elements as the beamforming architecture of FIG. 17A, but further includes transimpedance amplifiers 800 configured to convert their input photocurrent to an output voltage. As will be understood by the skilled worker transimpedance amplifiers may be used in any embodiment of the present disclosure that may require a current to be converted to a voltage.

Figure 18:
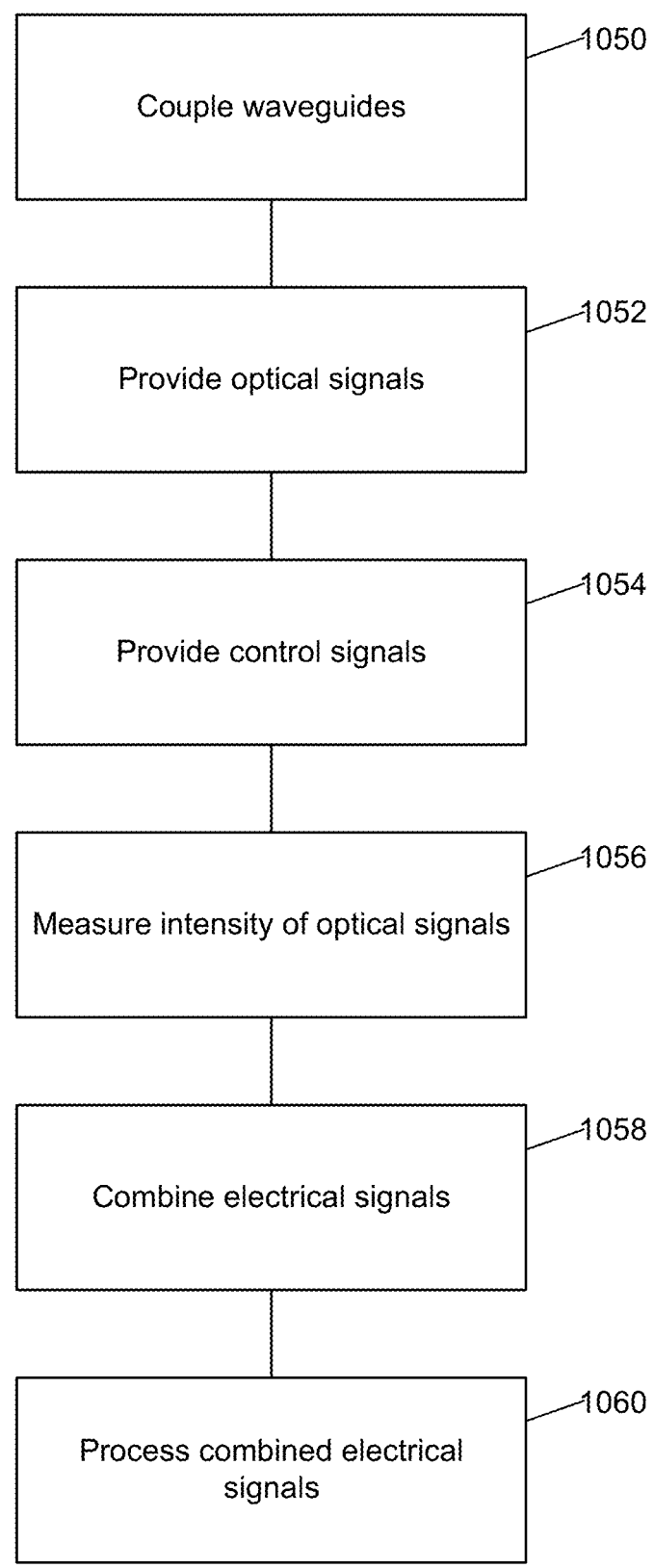
FIG. 18 illustrates a flowchart of an embodiment of a method in accordance with the present disclosure.

FIG. 18 illustrates a flowchart of an embodiment of a method in accordance with the present disclosure. The method of FIG. 18 is for processing wireless communication signals. The method may include, at action 1050, optically coupling a first set of waveguides to a second set of waveguides using PCM couplers. That is, action 1050 may include optically coupling each of a plurality of first waveguides to each of a plurality of second waveguides using a respective one of a plurality of phase change material (PCM) couplers. Each PCM coupler has a respective PCM element and each PCM element has an optical transmission coefficient, which, as described elsewhere in the present disclosure may be controlled electrically.

At action 1052 a plurality of optical signals are provided to the plurality of first waveguides. That is, a distinct optical signal is provided to each first waveguide of the plurality of first waveguides. Each of the distinct optical signal has encoded thereon a respective radio frequency (RF) signal or a respective baseband precoded signal. As an example, each of the plurality of first optical waveguides may be provided with the optical signals generated by an input module similar to the input module 721 shown at FIG. 12 or 14, which all have a respective RF signal encoded thereon according to an RF signal detected at the antennas 720, also shown at FIGS. 12 and 14. As another example, each of the plurality of first optical waveguides may be provided with the optical signals generated by input module 1016 shown at FIGS. 13 and 15, which all have a respective RF signal encoded thereon according to the output of the baseband precoder 1005 and 1110, shown at FIGS. 13 and 15 respectively.

Returning to FIG. 18, the method may include action 1054 where control signals are provided to the PCM elements. The control signals may be electrical control signals generated by a controller (e.g., a controller 207, as shown in FIG. 8). The controller may be programmed to output electrical signals in accordance with elements of a predetermined channel matrix of a wireless channel.

At action 1056, for distinct pairs of second waveguides, a difference in intensity between light propagating in a first waveguide of a respective pair of second waveguides and light propagating in a second waveguide of the respective pair of second waveguides may be determined or measured to obtain a plurality of balanced electrical signals. That is, for each of a plurality of distinct pairs of second waveguides, the method may include determining or measuring, with a respective balanced photodetector, a respective difference between a light intensity output from one of the second waveguides of the respective pair of second waveguides and a light intensity output from the other of the second waveguides of the respective pair of second waveguides, to obtain a plurality of balanced electrical signals.

At action 1058, the balanced electrical signals may be combined in pairs to obtain a plurality of combined electrical signals. That is, for each of a plurality of distinct pairs of balanced electrical signals of the plurality of balanced electrical signals, the balanced electrical signal of one of the respective pair of balanced electrical signals may be combined with the other balanced electrical signal of the respective pair of balanced electrical signal, to obtain a plurality of combined electrical signals. At action 1060, the plurality of combined electrical signal may be processed to obtain process signals. For example, the plurality of combined electrical signals may be processed by an output module like the output module 937 of FIG. 12 or 14, or by the output module 1031 of FIG. 13 or 15.

In accordance with embodiment of the present disclosure, uplink beamforming can be effected in scenarios where a base station receives an RF signal transmitted by a user. Initially, the RF signal may be used to modulate an optical signal at a specific wavelength. Subsequently, the modulated optical signal is split in four in accordance with four PCM couplers. One of the two pairs may be configured to realize $A_{lk}^{r}$ and the other pair may be configured to realize $A_{lk}^{i}$. When the transmission fractions of the PCM cells of the PCM couplers appropriately correspond to a desired phase shift $\varphi_{lk}$ as above, Cartesian weighing modulation is applied to the signal as it passes through a PCM crossbar array.

Hence, with PCM cells of PCM couplers applying Cartesian weights to a signal, an in-phase component (real part of the complex number), and a quadrature component (imaginary part of the complex number) may encoded into a combined (resulting) signal. The in-phase and quadrature components of the signal may be measured by two respective balanced photodetectors. The quadrature part may be phase-shifted by 90°, and then the signals are combined or added together using any suitable combining or adding device. The resulting signal is a version of the input RF signal that is phase shifted by a phase according to $A_{lk}^r$ and $A_{lk}^i$.

In embodiments presented herein, PCM cells of PCM couplers are able to retain or store information over the time interval in which long-term stochastics of a channel are not changing, without requiring any considerable power consumption. As such, a PCM cell can be employed as an element of a RF beamforming matrix, where the amount of light absorbed depends on its particular material phase configuration, which may be controlled by a controller.

Because of these features, a crossbar array of waveguides where each intersection is bridged by a PCM coupler, can be used to apply different amplitude modulations to different wave components of a passing signal. By selecting modulations according to complex Cartesian weighting, an analog beamforming architecture can be realized. And because stochastics information can be kept locally at the intersections of the crossbar array, where amplitude and phase shifting operations are performed, its use in a MIMO system does not require complete channel state information (CSI).

A crossbar array of PCM cells can be used both for analog beamforming and for storing long-term stochastics of a channel, without little to no power consumption. A phase shifting operation is performed in the optical domain of a crossbar array of PCM, and stochastics information can be stored in the PCM cells, the PCM cell memory being addressable in the electrical domain.

In embodiment of hybrid beamforming systems of the present disclosure, an alternative to obtaining complete channel state information is to use the channel's long-term statistics, i.e., the statistical channel parameters that vary slowly over time and that can be used over several channel realizations. These are what can be stored in a crossbar array of PCM couplers that can also perform phase shifting.

Embodiments of the present disclosure include a two-stage, hybrid beamforming architecture where the beamformer includes a first stage that includes a high-dimensional RF analog beamformer based on a crossbar array of PCM couplers.

Accordingly, for each channel realization, it can be sufficient to update the second stage, i.e., the stage with a low-dimensional matrix, and not the high-dimensional beamformer matrix. This can result in a significant reduction of computational cost.

In embodiments of hybrid beamforming system according to the present disclosure, phase shifts required in an analog (RF) beamformer of the first stage may be implemented with a non-volatile PCM crossbar array configured to perform complex Cartesian weighting. In particular, the non-volatility of PCM cells may be used to store the long-term stochastics of a wireless communication channel, and the storage may be performed at low power consumption. Because long-term information and slow-varying information of a channel can remain almost unchanged, the power and time consumption of a beamforming system/architecture according to embodiments of the present disclosure can be much less than a beamforming architecture of the prior art where values of the phase shifters must be updated much more frequently and where power consumption is required to store information in the system components. In general, the beamforming design, including the phase shifter values of an RF (analog) beamforming part, of a beamformer architecture, needs to be updated when the channel changes. In other words, the duration over which the phases can remain unchanged is equal to the "coherence time" of the channel (the time over which the channel can be considered unchanged). The coherence time of the channel itself depends on the nature of the environment, e.g., how fast the environment changes, how fast a user moves, and on the parameters of the wireless communication network, e.g., carrier frequency.

However, if the information (or changes in the information) in a channel is decomposed into long-term and short-term characteristics and phase shifters based on the long-term stochastics of the channel are used, then the phase shifters do not need to be updated in every channel realization, because the long-term stochastics of the channel change very slowly. Accordingly, in embodiments of the present invention, the phase shifter values, i.e., the optical properties of the PCM cells, need to be updated only when the long-term stochastics of the channel changes. Moreover, the PCM cells can retain the data during the time that the long-term stochastics of the channels remain valid with zero or no power consumption.

As will be understood by a skilled worker, in a phased array antenna, an RF signal made of a plurality of RF waves is received by an array of antenna elements, each element operative to apply a phase shift to a corresponding RF wave. Because each RF wave received by a corresponding antenna element has a distinct propagation path, each phase shift can be relative to that of an RF wave received by an adjacent antenna element.

Embodiments of optical beamforming systems of the present disclosure may be utilized in base stations in an uplink scenario with a combiner, or in a downlink scenario with a decoder. In either case, it can be partially connected or fully connected.

Designs for RF precoders and RF combiners typically require channel state information (CSI). However, with an architecture according to embodiments of the present disclosure, channel estimation steps and perfect (precise) CSI are not required, which can significantly reduce costs.

In an uplink scenario according to embodiments of the present disclosure, a user can be transmitting to a base station having a number NT of antenna elements, and a PCM-based beamforming architecture can have two stages, as shown in FIG. 12.

As in known in the art, frequency down-conversion is a technique that can be used for translating an RF signal down to a signal having a fixed intermediate frequency (IF) signal or to baseband (BB) frequency signal. A down-converter (for example a mixer) can work by multiplying the signal of interest (e.g., a RF signal) with a local oscillator (LO) to produce two signals, a first signal with frequency $f_1=f_{RF}+f_{LO}$ and a second signal with frequency $f_2=f_{RF}-f_{LO}$. An upper sideband at frequency $f_1$ can be filtered out of these signals so that the down-converter's output is a copy of the input signal (e.g. the signal of interest) shifted down to a lower frequency $f_2$. Frequency down-conversion can be implemented in the analog domain using optical or electronic components, or in a digital signal processor (DSP). However, digital down-conversion may be limited by the sampling rate of an ADC and hence, in a mmWave receiver, an analog frequency conversion may be required.

In an embodiment according to the present disclosure, an electronic down-converter (e.g., a mixing circuit, an RF mixer, or mixer) can be used. An electronic down-converter can be configured as a 3-port device that takes an RF signal and an LO signal as inputs and produces the sum and/or difference of these frequencies as an output. An electronic down-converter can be implemented using nonlinear devices such as diodes and field-effect transistors, and an electronic down-converter may further amplify the output signal. An unbalanced RF mixer can be realized by combining and injecting the RF signal and the LO signal at the input of a single diode. An LO signal can switch a diode between its ON state and OFF state, thereby gating the RF signal to the output at the LO signal's frequency.

A beamforming system/architecture according to embodiments of the present disclosure can also be used in a downlink scenario, where a base station equipped with multiple antenna elements 720 transmits a signal to one or more users. In this case, a PCM crossbar array can receive an up-converted version of a baseband signal that has already been processed by a low-dimensional baseband precoder.

A PCM-based beamforming architecture according to embodiments of the present disclosure may be operative to store and retain long-term statistical parameters (stochastics) of a wireless communication channel and can be combined with another kind of baseband processor. The baseband processing of a PCM-based beamformer can be performed in both the digital domain and in an optical computing platform, such as to benefit from the high bandwidth and low power consumption of photonic devices. FIG. 14 to 17 illustrate different ways in which a PCM-based architecture according to embodiments can be used.

Embodiments of the present disclosure include the use of photonics-based components including PCMs to implement an RF precoder of a RF transceiver and/or an RF combiner of an RF transceiver, for a fully connected beamforming architecture, or a partially connected beamforming architecture.

Embodiments of the present disclosure may include the implementation of phase shifting by applying complex Cartesian weights with at least two pairs of PCM cells, as well as the use of such phase shifting for beamforming. Embodiments further include protocols and circuit designs for writing to and reading from the PCM cells used for phase shifting.

Embodiments of the present disclosure may include two-stage PCM-based beamforming architectures for an uplink scenario and/or a downlink scenario, as well as the further use of a baseband precoder or a baseband combiner, which can be implemented in the digital domain or in the optical domain.

Embodiments of the present disclosure may include an RF precoder based on a PCM crossbar array, in which each RF signal is phase-shifted according to a target (desired) phase. An implementation can be for fully connected precoding or partially connected precoding.

Embodiments of the present disclosure include a two-stage beamforming architecture based on phase change materials (PCM). Benefits of such a configuration include avoiding the necessity of obtaining complete channel state information (CSI) in each channel realization and reducing the power consumption of a beamformer by storing the information in non-volatile PCM cells.

Embodiments of the present disclosure may allow for efficient scaling with the number of user equipment (UE) in a communication network, and with the number of antennas at a base station, and these embodiments are therefore candidates for massive MIMO systems in the next generations of wireless communications, i.e. 5G and 6G.

In embodiments of the present disclosure operating with very high radio frequencies can be used to perform beamforming faster and with lower computational complexity, because of the high bandwidth of optical signals being phase shifted for a computation. Hence, applications can be used in telecom infrastructures and by service providers requiring a low-cost transceiver architecture with a small footprint.

Embodiments of the present disclosure may include a method of beamforming based on a crossbar array of optical waveguides and PCM couplers, wherein waveguides are arranged as a set of horizontal parallel waveguides crossing a set of vertical parallel waveguides to form a crossbar array, and wherein each intersection is occupied by a PCM coupler operative to transmit an optical wave from a horizontal waveguide to a vertical waveguide, according to a value representing a positive or negative, real or complex part of a complex number. A benefit of such a configuration is to exploit the high bandwidth and speed of photonic computations.

Embodiments of the present disclosure may include an optical RF beamforming architecture that uses the non-volatile feature of a PCM crossbar array to capture long-term (frequency-independent) stochastics of wireless communication channel. This allows for RF beamformers having improved efficiencies in terms of time and energy.

Embodiments of the present disclosure may include an array of PCM couplers to implement a RF beamformer design based on the spatial covariance of the channel. A phase applied to an RF signal can be applied through two or more pairs of PCM cells, in accordance with a complex Cartesian weighting approach.

In embodiments of the present disclosure, optical waves of different wavelengths, that are amplitude-modulated according to a desired phase shift, can be summed incoherently with a balanced photodetector to produce a photocurrent representing a weighted sum of RF signal components.

Embodiments of the present disclosure may provide a tunable, scalable, and high-bandwidth beamforming architecture that avoids much of the complexity of channel estimation at a base station, thereby allowing a faster transmission.

An embodiment of the present disclosure may be utilized in a base station with a combiner in an uplink scenario or with a precoder in a downlink scenario, and it can be configured as a fully connected beamformer or a partially-connected beamformer.

A beamforming architecture according to embodiments of the present disclosure may be economical because obtaining channel state information requires less computation than with an alternative architecture.

A beamforming architecture according to embodiments of the present disclosure may be scaled up for a high number of UEs in a communication network and also with the number of antennas at a base station and is therefore a candidate to be used in massive MIMO system for future generations of wireless communications, such as 5G and 6G.

A beamforming architecture according to embodiments of the present disclosure may perform beamforming for emitted and received signals having very high radio frequencies and/or millimeter wavelengths, at a faster rate than other architectures, because a signal is converted to optical wavelengths that can be processed with lower computational complexity, and that have a higher bandwidth.

A beamforming architecture according to embodiments of the present disclosure may be integrated with an existing infrastructure.

A beamforming architecture according to embodiments of the present disclosure may be used in a telecom infrastructure, including where a small footprint is beneficial.

A PCM-based two-stage beamforming architecture according to embodiments of the present disclosure may be a fully connected beamforming architecture.

A PCM-based two-stage beamforming architecture according to embodiments of the present disclosure may be utilized in any uplink or downlink, fully connected or partially-connected RF transceiver architecture.

A PCM-based two-stage fully connected beamforming architecture according to embodiments of the present disclosure may be implemented for a spectrum usage technique such as time division duplex (TDD), frequency division duplex (FDD), and others.

A PCM-based two-stage fully connected beamforming architecture according to embodiments of the present disclosure may be used in single-carrier or a multiple sub-carrier scheme, such as orthogonal frequency division multiplexing (OFDM).

A PCM-based two-stage fully connected beamforming architecture according to embodiments of the present disclosure may be implemented in a communication network for any number of user equipment.

A PCM-based two-stage fully connected beamforming architecture according to embodiments of the present disclosure may be implemented at a base station for any number of antennas.

A PCM-based two-stage fully connected beamforming architecture according to embodiments of the present disclosure may be utilized in complex transmission scenarios such as multi-path and multi-cell communications.

In embodiments of the present disclosure, an RF or optical wave is an optical signal having a central wavelength for practical purposes. A person of ordinary skill in the art can recognize that an RF or optical wave has a linewidth such that the central wavelength is not the only wavelength of the RF or optical wave. In embodiments of the present disclosure, an RF or optical signal can include a plurality of RF or optical waves.

Embodiments of the present disclosure have been described above in conjunction with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A signal processing system for wireless communication, the system comprising:
   a photonic Cartesian complex-weighting module having:
      first optical waveguides each having a respective input port configured to receive a respective optical signal;
      second optical waveguides distinct from the first optical waveguides, the second optical waveguides each having a respective output port;
      a plurality of phase change material (PCM) couplers, each of the first optical waveguides being coupled to each of the second optical waveguides by respective PCM couplers of the plurality of PCM couplers, each PCM coupler of the plurality of PCM couplers configured to receive a respective electrical control signal to control an intensity of light coupled from a respective first optical waveguide into a respective second optical waveguide, a light intensity at the output port of each respective second optical waveguide being a weighted sum of the intensity of light coupled from each of the first optical waveguides into the respective second optical waveguide, the weighted sum being a function of the electrical control signals received at the respective PCM couplers that control the intensity of light coupled from the first optical waveguides into the respective second optical waveguide;
      a plurality of optical detector devices (ODDs), each of which coupled to a pair of output ports of a respective pair of second optical waveguides and configured to output a detector electrical signal indicative of a difference between a light intensity in a first one of the second optical waveguides of the pair of second optical waveguides and a light intensity in a second one of the second optical waveguides of the pair of second optical waveguide, each ODD being electrically coupled to one other ODD to form a pair of ODDs to produce a combined detector electrical signal;
   an input module coupled to the photonic Cartesian complex-weighting module and configured to generate each respective optical signal and to provide each respective optical signal to a respective first optical waveguide; and
   an output module coupled to the Cartesian complex-weighing module and configured to process the combined detector electrical signals.

2. The signal processing system of claim 1, wherein:
   each of the plurality of PCM couplers comprises a respective PCM element having a respective optical transmission coefficient,
   each respective electrical control signal is applied to the respective PCM element of the respective PCM coupler to change the respective optical transmission coefficient, each respective PCM element being configured to maintain the respective optical transmission coefficient in absence of any electrical control signal.

3. The signal processing system of claim 2, wherein each respective PCM element comprises a germanium-antimony-tellurium material, an arsenic trisulfide material, a vanadium dioxide material, and antimony telluride material, or an antimony sulfide material.

4. The signal processing system of claim 1, wherein the signal processing system is configured to communicate with user terminals through a spatial channel having associated thereto channel state information (CSI), the signal processing system further comprising a controller configured to generate the electrical control signals in accordance with the CSI.

5. The signal processing system of claim 1, wherein for each pair of ODDs coupled to each other to produce a respective combined detector electrical signal, the electrical control signals received by the PCM couplers coupled to the second waveguides coupled to one ODD of the pair of ODDs are set in accordance with a real part of a complex number and the electrical control signals received by the PCM couplers coupled to the second waveguides coupled to the other ODD of the pair of ODDs are set in accordance with an imaginary part of the complex number, an arctangent of a ratio of the imaginary part to the real part representing a predetermined phase shift.

6. The signal processing system of claim 1, wherein:
the signal processing system is a downlink signal processing system,
the input module is a baseband precoder module comprising a baseband precoder configured to generate a plurality of precoder output signals, a plurality of modulators, and a plurality of light sources, each of the plurality of modulators configured to receive a respective one of the plurality of precoder output signals and to modulate light output from a respective one of the plurality of light source in accordance with the respective one of the precoder output signals to obtain a respective modulated optical signal and to provide the respective modulated optical signal to a respective one of the first optical waveguides, and
the output module is an antenna module comprising a plurality of antennas, each of the plurality of antennas being coupled to the Cartesian complex-weighting module to receive a respective combined detector electrical signal.

7. The signal processing system of claim 6, wherein the baseband precoder is a digital baseband precoder.

8. The signal processing system of claim 6, wherein the baseband precoder is an optical baseband precoder.

9. The signal processing system of claim 6, wherein the plurality of antennas is a phased array of antennas.

10. The signal processing system of claim 1, further comprising:
a plurality of transimpedance amplifiers, each of which connected to a respective ODD and configured to amplify the respective detector electrical signal output by the respective ODD.

11. The signal processing system of claim 5:
wherein the signal processing system is a downlink signal processing system, comprising:
a plurality of ninety-degree phase shifters, wherein:
for each pair of ODDs coupled to each other to produce the respective combined detector electrical signal, a respective ninety-degree phase shifter is coupled to the ODD of the pair of ODDs that receives the electrical control signals set in accordance with the imaginary part of the complex number.

12. The signal processing system of claim 1, wherein:
the signal processing system is an uplink signal processing system, and
the input module is an antenna module comprising:
a plurality of antennas;
a plurality of modulators; and
a plurality of light sources, each of the plurality of antennas configured to receive a respective wireless signal and to generate a respective antenna electrical signal in accordance with the respective wireless signal, each of the plurality of modulators being coupled to a respective one of the plurality of antennas and to a respective one of the plurality of light sources, each of the plurality of modulators configured to modulate a respective optical signal generated by a respective one of the plurality of light sources in accordance with the respective antenna electrical signal to obtain a respective modulated optical signal, each of the plurality of modulators configured to provide the respective modulated optical signal to a respective one of the first optical waveguides; and
the output module is a baseband combiner module comprising a baseband combiner.

13. The signal processing of claim 12, wherein the baseband combiner is a digital baseband combiner.

14. The signal processing system of claim 12, wherein the baseband combiner is an optical baseband combiner.

15. The signal processing system of claim 12, further comprising:
a plurality of low noise amplifiers, each of which coupled to a respective one of the plurality of antennas and configured to amplify the respective antenna electrical signal.

16. The signal processing system of claim 12, wherein the plurality of antennas is a phased array of antennas.

17. The signal processing system of claim 1, wherein the plurality of ODDs is a plurality of balanced photodetectors.

18. A signal processing system for wireless communication, the system comprising:
a photonic Cartesian complex-weighting (CCW) module having:
first optical waveguides each having a respective input port configured to receive a respective optical signal;
second optical waveguides distinct from the first optical waveguides, the second optical waveguides each having a respective output port; and
a plurality of phase change material (PCM) couplers, each of the first optical waveguides being coupled to each of the second optical waveguides by respective PCM couplers of the plurality of PCM couplers, each PCM coupler of the plurality of PCM couplers configured to receive a respective electrical control signal to control an intensity of light coupled from a respective first optical waveguide into a respective second optical waveguide, a light intensity at the output port of each respective second optical waveguide being a weighted sum of the intensity of light coupled from each of the first optical waveguides into the respective second optical waveguide, the weighted sum being a function of the electrical control signals received at the respective PCM couplers that control the intensity of light coupled from the first optical waveguides into the respective second optical waveguide;
the CCW module configured to provide the light intensity at the output port of each respective second optical waveguide to a plurality of optical detector devices (ODDs) each of which coupled to a pair of output ports of a respective pair of second optical waveguides and configured to output a detector electrical signal indicative of a difference between a light intensity in a first one of the second optical waveguides of the pair of second optical waveguides and a light intensity in a second one of the second optical waveguides of the pair of second optical waveguide, each ODD being electrically coupled to one other ODD to form a pair of ODDs to produce a combined detector electrical signal.

19. The signal processing system of claim 18, wherein:
each of the plurality of PCM couplers comprises a respective PCM element having a respective optical transmission coefficient,
each respective electrical control signal is applied to the respective PCM element of the respective PCM coupler to change the respective optical transmission coefficient, each respective PCM element being configured to maintain the respective optical transmission coefficient in absence of any electrical control signal.

20. The signal processing system of claim 19, wherein each respective PCM element comprises a germanium-antimony-tellurium material, an arsenic trisulfide material, a vanadium dioxide material, and antimony telluride material, or an antimony sulfide material.

21. A method processing wireless communication signals, the method comprising:
 optically coupling each of a plurality of first waveguides to each of a plurality of second waveguides using a respective one of a plurality of phase change material (PCM) couplers, each PCM coupler having a respective PCM element, each PCM element having a transmission coefficient;
 providing a distinct optical signal to each first waveguide of the plurality of first waveguides, each distinct optical signal having encoded thereon a respective radio frequency (RF) signal or a respective baseband precoded signal;
 providing a respective electric control signal to each respective PCM element to control the transmission coefficient thereof;
 for each of a plurality of distinct pairs of second waveguides, measuring, with a respective balanced photodetector, a respective difference between a light intensity output from one of the second waveguides of the respective pair of second waveguides and a light intensity output from the other of the second waveguides of the respective pair of second waveguides, to obtain a plurality of balanced electrical signals;
 for each of a plurality of distinct pairs of balanced electrical signals of the plurality of balanced electrical signals, combining the balanced electrical signal of one of the respective pair of balanced electrical signals with the other balanced electrical signal of the respective pair of balanced electrical signal, to obtain a plurality of combined electrical signals; and
 processing the plurality of combined electrical signals.

* * * * *